US011496435B2

(12) United States Patent
Kerkes et al.

(10) Patent No.: US 11,496,435 B2
(45) Date of Patent: Nov. 8, 2022

(54) SYSTEMS, METHODS, AND APPARATUS TO FACILITATE MAPPING A DEVICE NAME TO A HARDWARE ADDRESS

(71) Applicant: The Nielsen Company (US), LLC, New York, NY (US)

(72) Inventors: Joseph Kerkes, Oldsmar, FL (US); Eric R. Hammond, Palm Harbor, FL (US)

(73) Assignee: The Nielsen Company (US), LLC, New York, NY (US)

( * ) Notice: Subject to any disclaimer, the term of this patent is extended or adjusted under 35 U.S.C. 154(b) by 473 days.

(21) Appl. No.: 15/337,902

(22) Filed: Oct. 28, 2016

(65) Prior Publication Data
US 2018/0124009 A1     May 3, 2018

(51) Int. Cl.
*H04L 61/103*     (2022.01)
*H04L 41/12*     (2022.01)
*H04L 61/58*     (2022.01)
*H04L 101/622*     (2022.01)

(52) U.S. Cl.
CPC ............ *H04L 61/103* (2013.01); *H04L 41/12* (2013.01); *H04L 61/58* (2022.05); *H04L 2101/622* (2022.05)

(58) Field of Classification Search
CPC ....... H04L 61/10; H04L 61/103; H04L 14/12; H04L 61/6009; H04L 61/6022; H04L 41/12; H04L 61/58
See application file for complete search history.

(56) References Cited

U.S. PATENT DOCUMENTS

| 6,639,611 | B1 * | 10/2003 | Leduc | G06F 40/177 |
| | | | | 715/236 |
| 7,702,309 | B2 | 4/2010 | Faccin et al. | |
| 7,886,033 | B2 * | 2/2011 | Hopmann | H04L 41/0893 |
| | | | | 709/224 |
| 8,484,550 | B2 * | 7/2013 | Gulwani | G06F 40/18 |
| | | | | 715/217 |
| 8,693,473 | B2 * | 4/2014 | Harjanto | H04L 67/14 |
| | | | | 370/252 |

(Continued)

OTHER PUBLICATIONS w3schools.com. "HTML Tables", publicly posted Oct. 26, 2015, 12 pages. (Year: 2015).*

(Continued)

*Primary Examiner* — George C Neurauter, Jr.
(74) *Attorney, Agent, or Firm* — Hanley, Flight & Zimmerman, LLC

(57) ABSTRACT

Systems, methods, and apparatus to identify media devices are disclosed. An example apparatus includes a listing retriever to retrieve a list of device names corresponding to devices identified as present on a local area network, the list of device names retrieved from a network activity measurement system located outside of the local area network. The example apparatus includes a communications analyzer to identify a list of hardware addresses of devices on the local area network. The example apparatus includes a mapper to receive a mapping between a device in the list of devices and a hardware address in the hardware addresses. The mapper is to transmit the mapping to the network activity measurement system.

15 Claims, 15 Drawing Sheets

(56) References Cited

U.S. PATENT DOCUMENTS

| | | |
|---|---|---|
| 8,842,697 B2 | 9/2014 | Pigeon |
| 8,884,742 B2 | 11/2014 | Gits et al. |
| 9,113,286 B1* | 8/2015 | Adams ............... G06Q 30/0623 |
| 9,277,278 B2* | 3/2016 | Barney ............ H04N 21/44213 |
| 9,331,975 B2* | 5/2016 | Besehanic .......... H04L 61/1511 |
| 9,363,558 B2* | 6/2016 | Meraviglia ...... H04N 21/44222 |
| 9,491,077 B2* | 11/2016 | Ahlers ................ H04L 43/0876 |
| 9,647,779 B2* | 5/2017 | Besehanic ............ H04H 60/32 |
| 9,756,133 B2* | 9/2017 | Harjanto .............. H04L 61/103 |
| 9,848,375 B2* | 12/2017 | Gould ................ H04L 61/6022 |
| 9,900,654 B2* | 2/2018 | Meraviglia ...... H04N 21/44222 |
| 10,078,846 B2* | 9/2018 | Besehanic ............. G06Q 30/02 |
| 10,237,294 B1* | 3/2019 | Zadeh ................ H04L 63/1425 |
| 10,284,665 B2* | 5/2019 | Besehanic ............. H04H 60/32 |
| 2001/0021037 A1* | 9/2001 | Itoh .................... H04N 1/00204 358/1.15 |
| 2003/0004971 A1* | 1/2003 | Gong .................. G06Q 10/087 |
| 2005/0240665 A1* | 10/2005 | Gu ...................... H04L 47/2408 709/223 |
| 2006/0101340 A1* | 5/2006 | Sridhar ............... H04L 67/1072 715/734 |
| 2007/0237141 A1* | 10/2007 | Marchese ............... H04L 41/12 370/389 |
| 2008/0101381 A1* | 5/2008 | Sun ................... H04L 29/12028 370/395.54 |
| 2009/0119280 A1* | 5/2009 | Waters .................... H04W 4/60 |
| 2009/0125615 A1* | 5/2009 | Murray ............. H04L 29/12028 709/221 |
| 2010/0176962 A1* | 7/2010 | Yossef .................... H04L 43/00 340/815.45 |
| 2010/0205037 A1* | 8/2010 | Besehanic .............. G06Q 30/02 705/7.34 |
| 2010/0241744 A1* | 9/2010 | Fujiwara ........... H04L 29/12028 709/224 |
| 2010/0257548 A1* | 10/2010 | Lee ........................ G06Q 30/02 725/9 |
| 2011/0185055 A1* | 7/2011 | Nappier .............. H04L 63/1433 709/224 |
| 2012/0151079 A1* | 6/2012 | Besehanic ............ H04N 21/252 709/231 |
| 2012/0215621 A1* | 8/2012 | Heffernan .............. G06Q 30/02 705/14.41 |
| 2012/0221716 A1 | 8/2012 | Halevi et al. |
| 2012/0324567 A1* | 12/2012 | Couto ................. H04L 63/0823 709/224 |
| 2013/0007236 A1* | 1/2013 | Besehanic ........ H04N 21/25891 709/223 |
| 2013/0044760 A1* | 2/2013 | Harjanto ................. H04L 67/14 370/401 |
| 2013/0060815 A1* | 3/2013 | Saeki ................ G06F 17/30575 707/802 |
| 2013/0111013 A1* | 5/2013 | Besehanic .............. H04H 60/31 709/224 |
| 2013/0124309 A1* | 5/2013 | Traasdahl ............... H04L 67/22 705/14.49 |
| 2013/0159499 A1* | 6/2013 | Besehanic ........... H04L 61/1511 709/224 |
| 2014/0181317 A1* | 6/2014 | Harjanto ................. H04L 67/14 709/228 |
| 2014/0273923 A1 | 9/2014 | Papakostas |
| 2014/0280896 A1* | 9/2014 | Papakostas ............. H04W 4/50 709/224 |
| 2014/0317270 A1* | 10/2014 | Besehanic .............. H04H 60/32 709/224 |
| 2015/0032905 A1 | 1/2015 | Celebi et al. |
| 2015/0143396 A1* | 5/2015 | Meraviglia ...... H04N 21/44222 725/14 |
| 2015/0178769 A1* | 6/2015 | Mirisola ............. H04L 63/0421 705/14.45 |
| 2015/0242066 A1* | 8/2015 | Chen ..................... G06F 3/0481 715/738 |
| 2016/0007083 A1* | 1/2016 | Gurha ................ G06Q 30/0201 725/13 |
| 2016/0065676 A1* | 3/2016 | Mergen ............... H04W 74/002 709/220 |
| 2016/0072677 A1 | 3/2016 | Gupta et al. |
| 2016/0112522 A1* | 4/2016 | Abello .................... H04L 67/22 709/224 |
| 2016/0277794 A1* | 9/2016 | Meraviglia ...... H04N 21/44222 |
| 2016/0308875 A1* | 10/2016 | Judge .................... H04L 63/102 |
| 2017/0244797 A1* | 8/2017 | Besehanic ............. H04H 60/32 |
| 2018/0124009 A1* | 5/2018 | Kerkes ................ H04L 61/6009 |
| 2018/0331915 A1* | 11/2018 | Cave ................... H04L 12/1831 |

OTHER PUBLICATIONS

Superuser, "How Can I Monitor Network Traffic in An All Mac Home Network?" [https://superuser.com/questions/149974/how-can-i-monitor-network-traffic-in-an-all-mac-home-network], retrieved Mar. 25, 2019, 7 pages.

* cited by examiner

421

| IP ADDRESS | MAC ADDRESS |
|---|---|
| 192.168.1.20 | 00:22:34:CD:56:EF |
| 192.168.1.32 | 00:19:AB:34:CD:12 |
| 192.168.1.31 | 4C:B1:99:12:EF:1A |
| 192.168.1.51 | 4C:B1:99:34:CD:86 |
| 192.168.1.50 | A0:D2:B1:BD:DC:66 |

460 → IP ADDRESS column; 465 → MAC ADDRESS column
471, 472, 473, 474, 475 → rows

| | 571 | 572 | 573 | 574 | 575 | 576 | 577 |
|---|---|---|---|---|---|---|---|
| | DEVICE NAME | SiteID | Type | Make | Model | Metered | Moveable |
| 581 | PS3 | Basement | Game | Sony | Play Station 3 | True | False |
| 582 | FAMILYROOM TV | Family Room | Internet | Google | Google TV | True | False |
| 583 | PS4 | Family Room | Game | Sony | Play Station 4 | True | False |
| 584 | XBOX | Play Room | Game | Microsoft | Xbox | True | False |
| | -- | -- | -- | -- | -- | -- | -- |

| | 591 MAC ADDRESS | 592 DEVICE NAME |
|---|---|---|
| 595 | 00:22:34:CD:56:EF | XBOX |
| 596 | 00:19:AB:34:CD:12 | PS3 |
| 597 | 00:19:AB:86:91:A2 | PS4 |
| 598 | A0:D2:B1:BD:DC:66 | FAMILYROOM TV |

DASHBOARD

Menu
- Configuration
- WIFI Password
- Device Map
- Realtime Events
- Meter Information

Device Map — 810

| SiteID | Type | Make | Model | Metered | Moveable | MACAddress | OUI | WiFi/Wired | Data Rate | Domain | Status |
|---|---|---|---|---|---|---|---|---|---|---|---|
| Basement | Game | Sony | Play Station 3 | True | ○ | 20:64:32:31:91:1c | | | | | ⊘⊕ |
| Family Room | Internet | Google | Google TV | True | ○ | 88:ae:1d:b7:cf:4a | COMPAL INFORM | Wired | 5 | | |
| Family Room | Game | Sony | Play Station 4 | True | ○ | 58:94:6b:03:8a:b8 | Intel Corporate | WiFi | 290 | | |
| Play Room | Game | Microsoft | Xbox | True | ○ | Select MAC | | | | | |
| .. | .. | .. | .. | .. | ○ | Select MAC | | | | | |

815, 820, 825, 830, 835 / 832

Unmapped Devices — 850

| MACAddress | OUI | WiFi/Wired | Data Rate | Domain | Status |
|---|---|---|---|---|---|
| 00:6b:9e:55:59:e8 | VIZIO Inc | WiFi | 0 | control-zoo-cstage.tvinteractive.tv | ⊕ |

[Request Device Map] [Save Device Map] [CheckOut]

Meter Time
Local Time 2016/10/31,14:17
UTC 2016/10/31,19:17

Meter Log
2016/10/31,14:16 Device map received
2016/10/31,14:16 MICD_Download Success: MICD_DownloadSuccess
2016/10/31,14:16 Decrypt Success: decryption SUCCESS on MAC 00:6b:9e:55:59:e8
2016/10/31,14:16 Decrypt Success: decryption SUCCESS on MAC 58:94:6b:03:8a:b8
2016/10/31,14:17 DeauthenticationStart: Deauthenticate commenced on b8:8d:12:0e:bf:ae

[Pause] [Clear]

Meter Status
- Meter
- Access Point
- Internet
- Back Office
- Time Sync

Logout

800

SYSTEMS, METHODS, AND APPARATUS TO FACILITATE MAPPING A DEVICE NAME TO A HARDWARE ADDRESS

FIELD OF THE DISCLOSURE

This disclosure relates generally to monitoring network activity, and, more particularly, to systems, methods, and apparatus to facilitate mapping a device name to a hardware address.

BACKGROUND

Media providers and/or metering entities such as, for example, advertising companies, broadcast networks, etc. are often interested in the viewing, listening, and/or media behavior/interests of audience members and/or the public in general. To collect these behavior/interests, an audience measurement company may enlist panelists (e.g., persons agreeing to be monitored) to cooperate in an audience measurement study for a period of time. The media usage habits of these panelists as well as demographic data about the panelists is collected and used to statistically determine the size and demographics of an audience. In recent years, more consumer devices have been provided with Internet connectivity and the ability to retrieve media from the Internet.

BRIEF DESCRIPTION OF THE DRAWINGS

FIG. 4A is an example address resolution protocol (ARP) table that may be stored by the example network communications data store of the example network communications monitor of FIGS. 1, 2, 3, and/or 4 to associate an Internet protocol (IP) address with a hardware address.

FIG. 5A is an example data table that may be stored by the example panelist device data store of FIG. 5 to store a list of panelist devices and additional properties associated therewith.

FIG. 5B is an example data table that may be stored by the example panelist device data store of FIG. 5 to store a mapping between a hardware address and a device name.

FIG. 8 is an example interface that may be presented by the example interface presenter of the example network communications monitor of FIGS. 1, 2, 3, and/or 4 to facilitate mapping of devices in the panelist household to device names.

DETAILED DESCRIPTION

Figure 1:
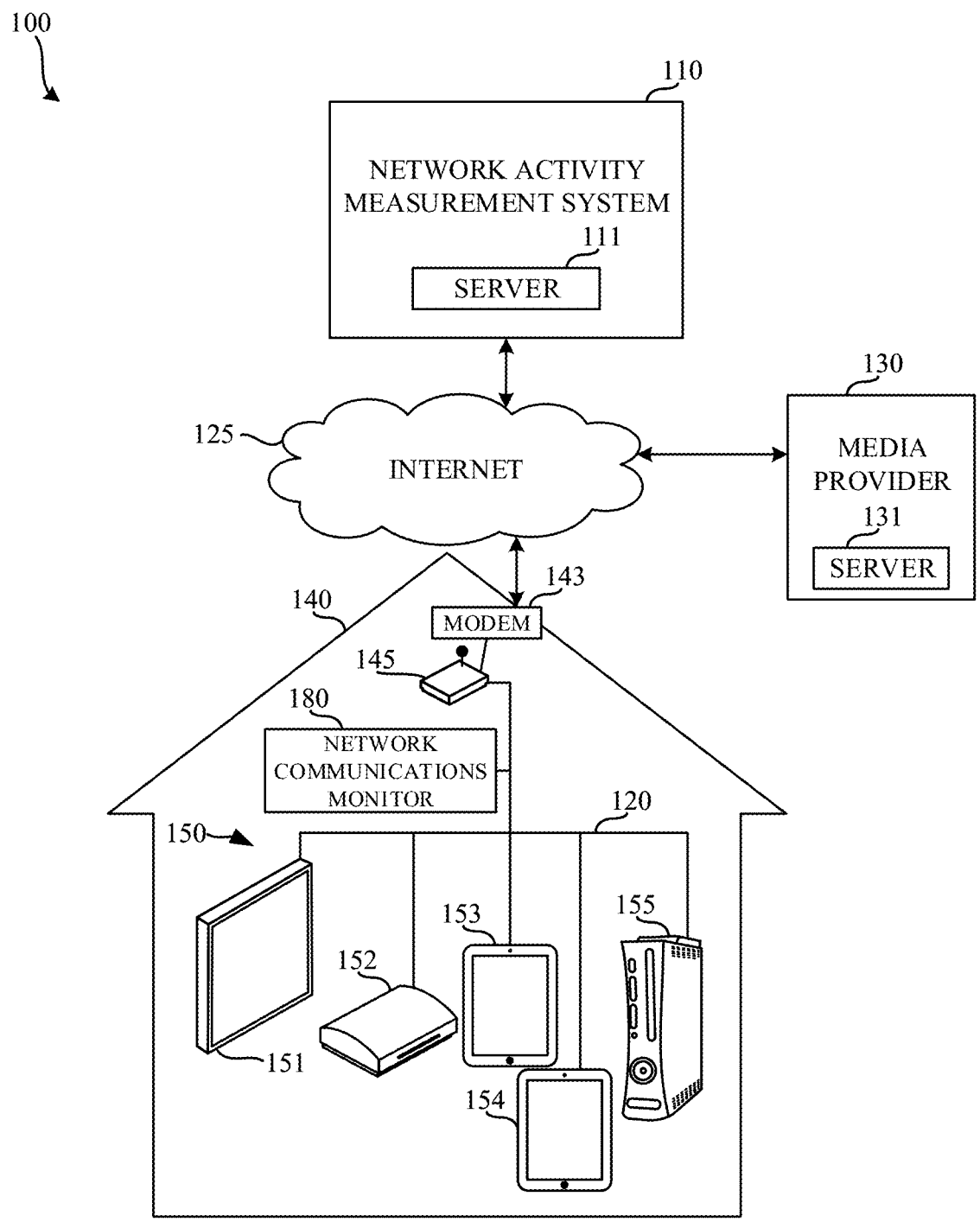
FIG. 1 is a block diagram of an example environment of use including an example system to facilitate mapping a device name to a hardware address.

Media monitoring entities desire to monitor activities of media devices present on a user's (e.g., a panelist's) network (e.g., a home network). In some examples, media devices are implemented and/or instrumented with an on-device meter that monitors operations of the media device (e.g., what media is presented by the media device, when the media is presented, etc.). However, not all media devices are amenable to being monitored by an on-device meter. For example, some media devices do not allow installation of third-party software (e.g., an on-device meter). Further, because of the many types of media devices available, maintaining software packages for every type of media device is difficult. Because installation of a monitoring system on all types of network devices may be difficult some network devices may go unmonitored. In examples disclosed herein, network-based monitoring (e.g., monitoring of network communications and/or requests made by media devices) is used to collect network communications of network devices. Network communications of a network device can be used to identify media that is transmitted to and/or from a media device.

As used herein, the term "media" includes any type of content and/or advertisements, such as television programming, radio programming, news, movies, web sites, etc. Example methods, apparatus, and articles of manufacture disclosed herein identify media devices and/or types of media devices for media measurement. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc. In some examples, identifications of media devices used in consumer locations (e.g., homes, offices, etc.) are aggregated to determine ownership and/or usage statistics of available media devices, relative rankings of usage and/or ownership of media devices, types of uses of media devices (e.g., whether a device is used for browsing the Internet, streaming media from the Internet, etc.), and/or other types of media device information.

In some disclosed examples, a media device includes a network interface to transmit a request for media to be presented by the media device. In such examples, the media device requests media from a media provider via a network (e.g., the Internet). In some examples, the request for media is a HyperText Transfer Protocol (HTTP) request, a Session Initiation Protocol (SIP) message, a domain name service (DNS) query, a file transfer protocol (FTP) request, and/or any other type of request for media (e.g., content and/or advertisements).

Internet Service Providers (ISPs) typically provide a single public Internet protocol (IP) address for each media exposure measurement location (e.g., a media presentation location, a panelist household, an internet café, an office, etc.) receiving Internet services. In some examples, multiple devices (e.g., media devices) are communicatively coupled by a local area network (LAN) at a media exposure measurement location. In some examples, the LAN includes a router and/or gateway that accesses another network (e.g., the Internet) using a public IP address associated with the media exposure measurement location.

Within the LAN, individual media devices are given private IP addresses by, for example, a dynamic host control protocol (DHCP.) When a media device within the LAN transmits a request to a resource outside of the LAN (e.g., on the Internet,) the router and/or gateway translates the originating (private) IP address of the device making the query to the public address of the router and/or gateway before relaying the request outside of the LAN (e.g., to the Internet). Thus, when the resource outside of the LAN receives the request, the resource is able to transmit a return message (e.g., a response) to the LAN. On the return path, the router and/or gateway translates the destination IP address of the response to the private IP address of the requesting device so that the return message may be delivered to the media device that made the original request.

Some networks utilize Internet Protocol (IP) for communication. The IP address scheme utilizes IP addresses assigned to media devices. For example, a media device might be assigned an IP version 4 (IPv4) address of 192.168.0.2. Any other past, present, and or future addressing scheme may additionally or alternatively be used such as, for example, IP version 6 (IPv6). In some examples, IP addresses are dynamically assigned using DHCP. Both public and private IP addresses may be assigned using DHCP. In some examples, the IP address assignment is referred to as a lease. IP address leases are generally time-dependent in that they are only valid for a particular period of time (e.g., one day, one week, one month, etc.) After the expiration of the lease, the media device requests a new IP address from a DHCP server (e.g., a router, a server, etc.). Accordingly, more than one IP address might be associated with a media device over an extended period of time. For example, at a first time, the media device might be identified by an IP address of 192.168.0.2, while at a second time, the media device might be identified by an IP address of 192.168.0.3. Further, a second media device may be assigned the first IP address at the second time. Accordingly, identifying which device is associated with network requests occurring on a network based on the IP address alone is difficult.

Network interfaces of media devices are provided with a hardware address. In examples disclosed herein, the hardware address is referred to as a media access control (MAC) address. However, any other past, present, and/or future hardware address naming convention and/or scheme may additionally or alternatively be used. The MAC address is a serial number of the network interface of the media device.

In IP communications, MAC addresses are used to identify the media device to which an IP address is assigned. Unlike an IP address, the MAC address does typically not change over time and/or does not change frequently. The MAC address of a media device is provided by the hardware manufacturer of the media device at the time of manufacture. In some examples, the MAC address may be changed at a later time (e.g., after manufacturing the device). In examples disclosed herein, the MAC address is a forty-eight bit identifier, and is typically represented as a twelve character hexadecimal identifier. However, any other representation may additionally or alternatively be used. For example, the MAC address convention may change over time to use different numbers and/or types of characters.

In some examples, the MAC address includes an organizationally unique identifier (OUI) (e.g., a twenty-four bit identifier). An OUI is used to identify the manufacturer and/or model of the media device. In some examples, the first twelve bits of the OUI identify a manufacturer, while the second twelve bits of the OUI identify a model of the device. Accordingly, a manufacturer and/or model of a device may be identified based on the OUI. The OUI, however, does not distinguish between multiple media devices of the same manufacturer and model. For example, a first iPad may have the same OUI as a second iPad. However, the devices will typically be uniquely identified by the remainder of the MAC address (e.g., the portion of the MAC address following the OUI).

When transmitting network communications (e.g., transmission control protocol (TCP) communications, user datagram protocol (UDP) communications, etc.) the MAC address of the media device is typically not included. Rather, in such messages, the IP address identifies the media device. As disclosed above, the IP address may change over time and, therefore, may not uniquely identify the media device over an extended period of time. To translate an IP address into a MAC address, media devices include an address resolution protocol (ARP) table. ARP is used to translate a network address (e.g., an IP address) into a hardware address (e.g., a MAC address). The ARP table is maintained by media devices (e.g., a router and/or a gateway) and identifies both a MAC address and an IP address for media devices on the network. As a result, a MAC address can be identified based on an IP address by performing a lookup using the ARP table. However, any other type of table and/or device identification protocol may additionally or alternatively be used such as, for example a neighbor discovery protocol (NDP) (e.g., for use with IP version 6 (IPv6)).

In some examples, network resources (e.g., servers providing media to the media devices) are identified by domain names. Domain names are human readable identifiers that identify a network resource. While an IP address of a network resource might change over time, the domain name typically remains the same. Domain names typically remain the same because they are purchased by the media provider as a way for users to easily identify the service provided by the service provider. As the IP address of the media provider changes (e.g., because the media provider is now hosting their service via a different server, etc.), the domain name is updated to be associated with the most recent IP address.

In examples disclosed herein, a device name is used to identify a media device. For example, a media device may be associated with a panelist and/or a household, and may have a device name (e.g., "Suzie's iPad", "Smith Family iPad 01", etc.) to facilitate identification of the media device to the panelist and/or an installer (e.g., a representative of a media monitoring entity). In some examples disclosed herein, device names are provided when a panelist enrolls in a panel (e.g., the panelist provides a list of devices present in the panelist household). In such examples, the panelist and/or installer may name the devices within their household and provide some additional properties about the device. For example, the panelist and/or installer may identify information concerning a location of the device within the panelist household (e.g., in the living room, in the basement, etc.), a primary user of the device, a manufacturer of the device, etc. In examples disclosed herein, a mapping of the device name to the MAC address of the device is made by an installer and/or by a user of the media device during a mapping procedure. However, any other party may provide device names and/or associate the device name with the MAC address of the media device during any other procedure. The device name and/or additional properties connected with the device name can later be presented during the mapping procedure and/or used during the mapping procedure to facilitate association of the MAC address with the device name by the installer and/or user.

In examples disclosed herein, a network communications monitor is used to capture network communications of media devices on a network (e.g., a home network). The network communications monitor is installed at a media exposure measurement location (e.g., a home) and identifies network communications to and/or from media devices within the media exposure measurement location (e.g., the communications of devices sharing a public IP address via, for example, a gateway). Thus, the example network communications monitor monitors network devices within the media exposure measurement location.

In examples disclosed herein, network monitoring performed by the network communications monitor includes determining a MAC address of a device involved in network communications within a panelist household. While the MAC address is not contained in the network communications itself, it is determined using, for example, an address resolution protocol (ARP) lookup. The network communications monitor creates a log and/or a record of the network communications, identifies a device associated with the network communications (e.g., a device that originates and/or receives the network communications), and electronically transmits the log and/or the record to the network activity measurement system (e.g., to an audience measurement entity such as The Nielsen Company (US), LLC). In some examples, the log of network communications created by the network communications monitor may be transmitted by electronic communications, physically mailing the log (e.g., a log stored on a memory device such as, for example, a flash memory, a compact disc, a DVD, etc.), etc.

In addition to providing monitoring functionality for collecting and reporting network communications, the example network communications monitor facilitates association of MAC addresses of devices within a panelist household (e.g., connected to the home network of the panelist home) with device names provided by a panelist and/or installer. In examples disclosed herein, the network communications monitor gathers a list of device names from an audience measurement entity and displays an interface to enable the panelist and/or installer to map a device name to a MAC address. In examples disclosed herein, the network communications monitor identifies suggested mappings based on, for example, an organizationally unique identifier (OUI) portion of the MAC address as compared to a manufacturer of the device associated with the device name as identified by the panelist and/or installer (e.g., if the panelist identifies that they have an APPLE® device on their home network, devices having a MAC address matching an OUI associated with APPLE® may be suggested), an amount of recent network communications transmitted in connection with a MAC address (e.g., to identify a device, the panelist may cause the device to transmit and/or request data such that network activity can be used to identify the device), etc. In examples disclosed herein, suggested mappings are identified as a sorted list. However, any other approach to suggesting a mapping between a user-provided device name to a MAC address may additionally or alternatively be used.

Some example methods, apparatus, and articles of manufacture disclosed herein are located at a media exposure measurement location having one or more media devices. In some examples, these example methods, apparatus, and articles of manufacture are interposed between the media devices and a wide area network (WAN), such as the Internet, that includes one or more media providers that provide media in response to request(s) from the media devices. In some examples, the methods, apparatus, and articles of manufacture are interposed on a local area network (LAN) in the same fashion as other media devices are connected to the LAN. Some example methods, apparatus, and articles of manufacture disclosed herein intercept messages to and/or from the WAN (e.g., media requests (e.g., HTTP requests) from media devices on the same LAN as the intercepting method, apparatus, or article of manufacture.) When intercepting messages to and/or from the WAN, in some examples, the network communications monitor identifies an internal (e.g., private) IP address associated with the intercepted message (e.g., a destination IP address or a source IP address). In some examples, the internal IP address is used when determining the MAC address of the media device associated with the intercepted message.

Some example methods, apparatus, and articles of manufacture disclosed herein inspect the network communications to determine if the network communications should be recorded. Not all network requests are of interest to the monitoring entity. For example, when the network communications monitor identifies hypertext transfer protocol (HTTP) requests, the network communications are transmitted to a network activity measurement system and/or stored for transmission to the network activity measurement system at a later time. In contrast, when the network communications monitor identifies a message not associated with media presentation (e.g., a border gateway protocol (BGP) message), the network communications monitor may ignore such a message. In some other examples, the message may be ignored when a device name and/or a MAC address cannot be determined. Some such example methods, apparatus, and articles of manufacture additionally or alternatively determine ownership and/or usage statistics based on messages from the WAN to the media devices on the LAN. Some example methods, apparatus, and articles of manufacture disclosed herein determine the type(s) of media device based on the network communications (e.g., via HTTP queries contained in the communications, via a MAC address associated with the media device, via a device name associated with the media device, via device properties provided by the panelist and/or installer, etc.) but, unlike media providers that track usage statistics, do not return media to the media device(s) in response to the network communications.

FIG. 1 is a block diagram illustrating an example environment of use 100 including a system to identify media devices. The example system of FIG. 1 includes a network activity measurement system 110, and a network communications monitor 180. The network communications monitor 180 monitors communications occurring on and/or involving a LAN 120 (e.g., a home network). The example environment 100 of FIG. 1 includes the LAN 120, the Internet 125, an example media exposure measurement location 140, and an example media provider 130. The example media exposure measurement location 140 of FIG. 1 includes an example network gateway 145, an example modem 143, and example media devices 150. The network gateway 145 is able to communicate with, for example, the example media provider 130 via the Internet 125. In the illustrated example, network devices 150 include a first media device 151, a second media device 152, a third media device 153, a fourth media device 154, and a fifth media device 155.

The network activity measurement system 110 of the illustrated example includes a server 111 that receives network communications collected by the network communications monitor 180 to generate media monitoring information. The server 111 of the network activity measurement system 110 of FIG. 1 analyzes the network communications across multiple measurement locations such as the example measurement location 140 and/or network communications monitors 180 to identify, for example, which media devices are the most owned, the most-frequently used, the least-frequently owned, the least-frequently used, the most/least-frequently used for particular type(s) and/or genre(s) of media, and/or any other media statistics or aggregate information that may be determined from the data. The media device information may also be correlated or processed with factors such as geodemographic data (e.g., a geographic location of the media exposure measurement location, age(s) of the panelist(s) associated with the media exposure measurement location, an income level of a panelist, etc.) Media device information may be useful to manufacturers and/or advertisers to determine which features should be improved, determine which features are popular among users, identify geodemographic trends, occurrence(s) related to and/or behaviors of (e.g., demographic group(s) in physical geographic area(s) (e.g., North America, the South Eastern US, etc.)) with respect to media devices, identify market opportunities, and/or otherwise evaluate their own and/or their competitors' products. In some examples, the network activity measurement system 110 is a central measurement system that receives and/or aggregates monitoring information collected at multiple different measurement sites.

The Internet 125 of the illustrated example of FIG. 1 is a wide area network (WAN). However, in some examples, local networks may additionally or alternatively be used. For example, multiple networks may be utilized to couple the components of the example system 100 to identify media devices.

In the illustrated example, the media devices 150 of FIG. 1 are devices that retrieve media from the media provider 130 (e.g., via gateway 145) for presentation at the media exposure measurement location 140. In some examples, the media devices 150 are capable of directly presenting media (e.g., via a display) while, in some other examples, the media devices 150 present the media on separate media presentation equipment (e.g., speakers, a display, etc.). The first media device 151 of the illustrated example is an Internet enabled television, and thus, is capable of directly presenting media (e.g., via an integrated display and speakers). The second media device 152 of the illustrated example is a first gaming console (e.g., Xbox®, PlayStation® 3, etc.) and requires additional media presentation equipment (e.g., a television) to present media. The third media device 153 and the fourth media device 154 are tablet devices. In the illustrated example, the third media device 153 and the fourth media device 154 are the same type of device from the same manufacturer (e.g., both the third media device 153 and the fourth media device 154 are Apple iPads). Accordingly, the OUI (e.g., a manufacturer and/or device specific portion of the MAC address) of the third media device 153 and the fourth media device 154 are the same. The fifth media device 155 of the illustrated example is a second gaming console (e.g., Xbox®, PlayStation® 3, etc.) and requires additional media presentation equipment (e.g., a television) to present media. Although the fifth media device 155 and the second media device 152 are both gaming consoles, they are not made by the same manufacturer and, accordingly, do not share the same OUI.

While, in the illustrated example, an Internet enabled television, gaming consoles, and tablet devices are shown, any other type(s) and/or number(s) of media device(s) may additionally or alternatively be used. For example, Internet-enabled mobile handsets (e.g., a smartphone), tablet computers (e.g., an iPad®, a Google Nexus, etc.) digital media players (e.g., a Roku® media player, a Slingbox®, etc.,) etc. may additionally or alternatively be used. Further, while in the illustrated example five media devices are shown, any number of media devices may be used. While in the illustrated example, media devices 150 may be wired devices (e.g., connected to the network communications monitor 180 via wired connection such as, for example, an Ethernet connection) the media devices 150 may additionally or alternatively be wireless devices (e.g., connected to the network communications monitor 180 via a wireless connection such as, for example, a WiFi connection, a Bluetooth connection, etc.)

The media provider 130 of the illustrated example of FIG. 1 includes a server 131 providing media (e.g., web pages, videos, images, advertisements, etc.). The media provider 130 may be implemented by any provider(s) of media such as a digital broadcast provider (e.g., a cable television service, a fiber-optic television service, etc.) and/or an on-demand digital media provider (e.g., Internet streaming video and/or audio services such as Netflix®, YouTube®, Hulu®, Pandora®, Last.fm®,) and/or any other provider of media services (e.g., streaming media services). In some other examples, the media provider 130 is a host for a web site(s). Additionally or alternatively, the media provider 130 may not be on the Internet. For example, the media provider may be on a private and/or semi-private network (e.g., a LAN.)

The media exposure measurement location 140 of the illustrated example of FIG. 1 is a panelist household. However, the media exposure measurement location 140 may be any other location, such as, for example an internet café, an office, an airport, a library, a non-panelist household, etc. While in the illustrated example a single media exposure measurement location 140 is shown, any number and/or type(s) of media exposure measurement locations may be used.

The modem 143 of the illustrated example of FIG. 1 is a modem that enables network communications of the media exposure measurement location 140 to reach the Internet 125. In some examples, the modem 143 is a digital subscriber line (DSL) modem, while in some other examples the modem 143 is a cable modem. In some examples, the modem 143 is a media converter that converts one communications medium (e.g., electrical communications, optical communications, wireless communications, etc.) into another type of communications medium. In the illustrated example, the modem 143 is separate from the network gateway 145. However, in some examples, the modem 143 may be a part of (e.g., integral to) the network gateway 145.

The example network gateway 145 of the illustrated example of FIG. 1 is a router that enables the media devices 150 to communicate with the Internet 125 (e.g., the Internet). In some examples, the example network gateway 145 includes gateway functionality such as modem capabilities. In some other examples, the example network gateway 145 is implemented in two or more devices (e.g., a router, a modem, a switch, a firewall, etc.).

In some examples, the example network gateway 145 hosts a LAN 120 for the media exposure measurement location 140. In the illustrated example, the LAN 120 is a wired local area network (LAN) that enables the media devices 150 to communicate over a wired electrical connection, and allows the media devices 150 to transmit and receive data via the Internet. In some examples, the LAN 120 is a wireless LAN (WLAN) that enables the media devices 150 to communicate wirelessly. In examples disclosed herein, the example network communications monitor 180 is coupled to the LAN 120.

The network communications monitor 180 of the illustrated example of FIG. 1 is a network device located on the LAN hosted by the example network gateway 145. Additionally or alternatively, the network communications monitor 180 may be integrated into the gateway 145. The network communications monitor 180 of the illustrated example identifies network communications from the media devices 150 within the media exposure measurement location 140. The network communications monitor 180 creates a record (e.g., a log) identifying which of the media device(s) 150 were involved in which of the network communications and transmits the record to the network activity measurement system 110. In some examples, the network communications monitor 180 determines which device was involved in the network communications by inspecting the network communications received at the network communications monitor 180 for indicia that may identify the media device and/or may facilitate identification of the media device (e.g., an IP address that may be used to lookup a MAC address via an ARP table).

In some examples, the example network gateway 145 permits custom firmware and/or software to be loaded and/or executed. In some such examples, the network gateway 145 may be provided with firmware and/or software to implement the network communications monitor 180 (in whole or in part). In such an example, in addition to standard routing and/or modem behavior, the firmware and/or software monitors messages and/or data packets directed from the media devices 150 to the Internet 125 and/or directed from the Internet 125 to the media devices 150. As noted above, such monitoring functionality may be part of and/or shared with a separate device such as, for example, the network communications monitor 180.

In operation, the example network activity measurement system 110 receives a list of device names from a panelist when the panelist enrolls in a panel (e.g., the panelist provides a list of devices present in the panelist household). In some examples, additional information about each named device is provided such as, for example, a primary user of the device, a location of the device, etc. The example network communications monitor 180 is provided to the panelist and/or otherwise delivered to the media exposure measurement location 140 and is connected to the LAN 120. The example network communications monitor 180 monitors network communications occurring on the LAN 120. Such communications may be indicative of media presentations occurring in the media exposure measurement location 140. The example network communications monitor 180 retrieves the list of device names and scans the LAN 120 to identify hardware addresses of devices on the LAN 120. The example network communications monitor 180 receives mapping information indicating a relationship between a hardware address on the LAN and a device name in the list of device names. The example network communications monitor 180 reports the mapping to the network activity measurement system 110. The example network communications monitor 180 reports the network communications monitored on the network to the network activity measurement system 110. The example network activity measurement system 110 using the reported network communications and the mapping prepares media exposure measurement reports.

Figure 2:
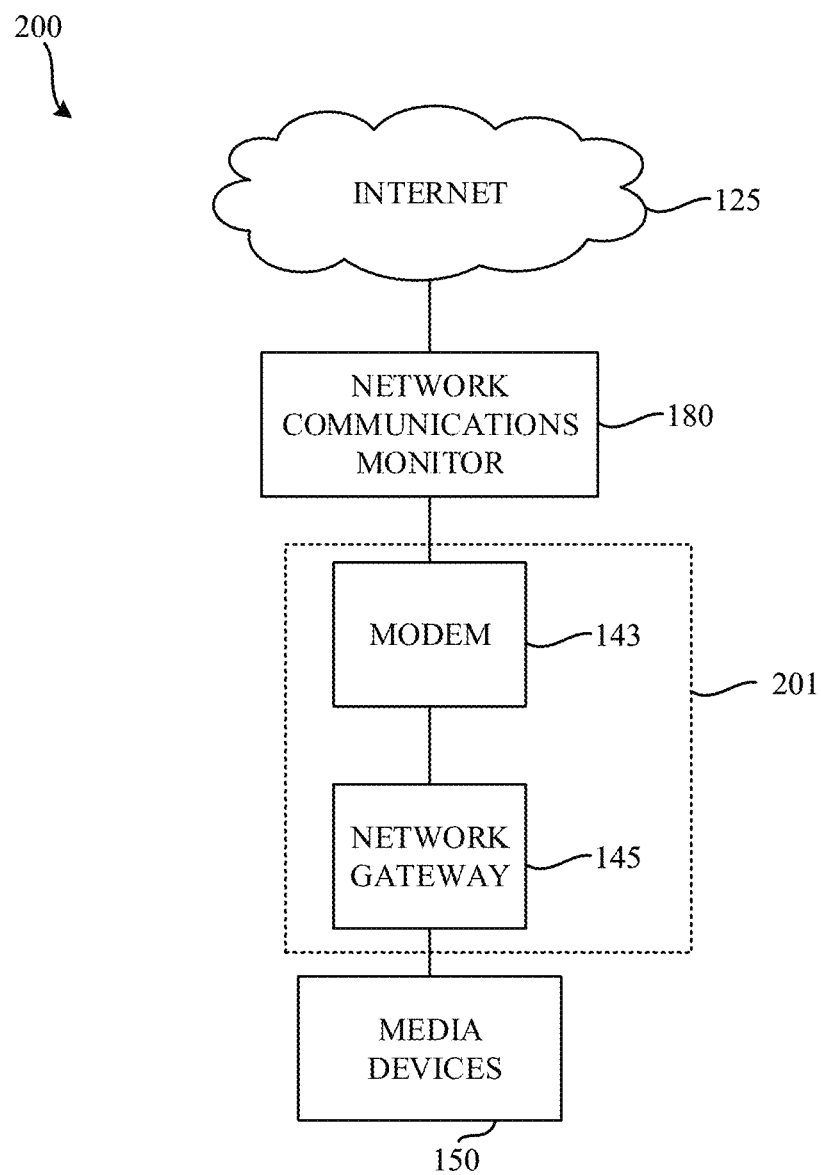
FIG. 2 is a block diagram of an example configuration of the media devices shown in FIG. 1.

FIG. 2 is a block diagram of a second example configuration 200 of the local area network 120 shown in FIG. 1. In the example configuration 200 of the illustrated example, the network communications monitor 180 is placed between the Internet 125 and the modem 143. The modem 143 communicates with the network gateway 145, which in turn communicates with the media devices 150. In some examples, the modem 143 and the network gateway 145 are implemented in a same device and/or housing 201.

In the illustrated example, the network communications monitor 180 monitors communications between the modem 143 and the Internet 125. For example, when the modem 143 is a DSL modem the network communications monitor 180 monitors the DSL communications. In the illustrated example, the network communications monitor 180 includes one or more ports (e.g., a DSL port, a cable port, etc.) for receiving and/or transmitting network communications.

Figure 3:
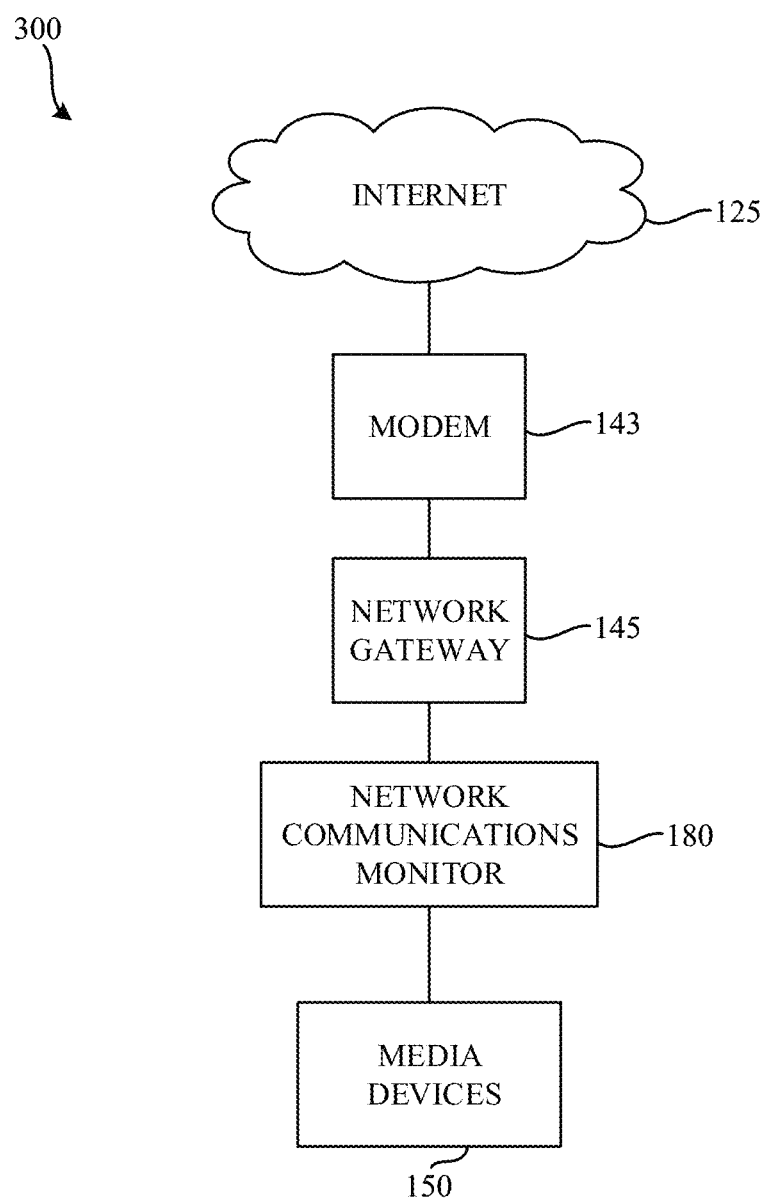
FIG. 3 is a block diagram of another example configuration of the media devices shown in FIG. 1.

FIG. 3 is a block diagram of a third example configuration 300 of the LAN shown in FIG. 1. In the example configuration 300 of FIG. 3, the network communications monitor 180 is placed between the network gateway 145 and the media devices 150. Thus, the modem 143 communicates with the network gateway 145. The network gateway 145 communicates with the media devices 150, and those communications pass through the network communications monitor 180.

In the illustrated example of FIG. 3, the network communications monitor 180 monitors communications between the network gateway 145 and the media devices 150. In some examples, the network communications monitor 180 is a network routing device (e.g., a router, a switch, a hub, etc.) that monitors network communications. In the illustrated example, because the modem 143 and the network gateway 145 are adjacent, they may be combined into a single device. For example, a combined gateway and modem device may additionally or alternatively be used. In some examples, the network communications monitor 180 is additionally or alternatively integrated in the network gateway and/or in the modem 143.

Figure 4:
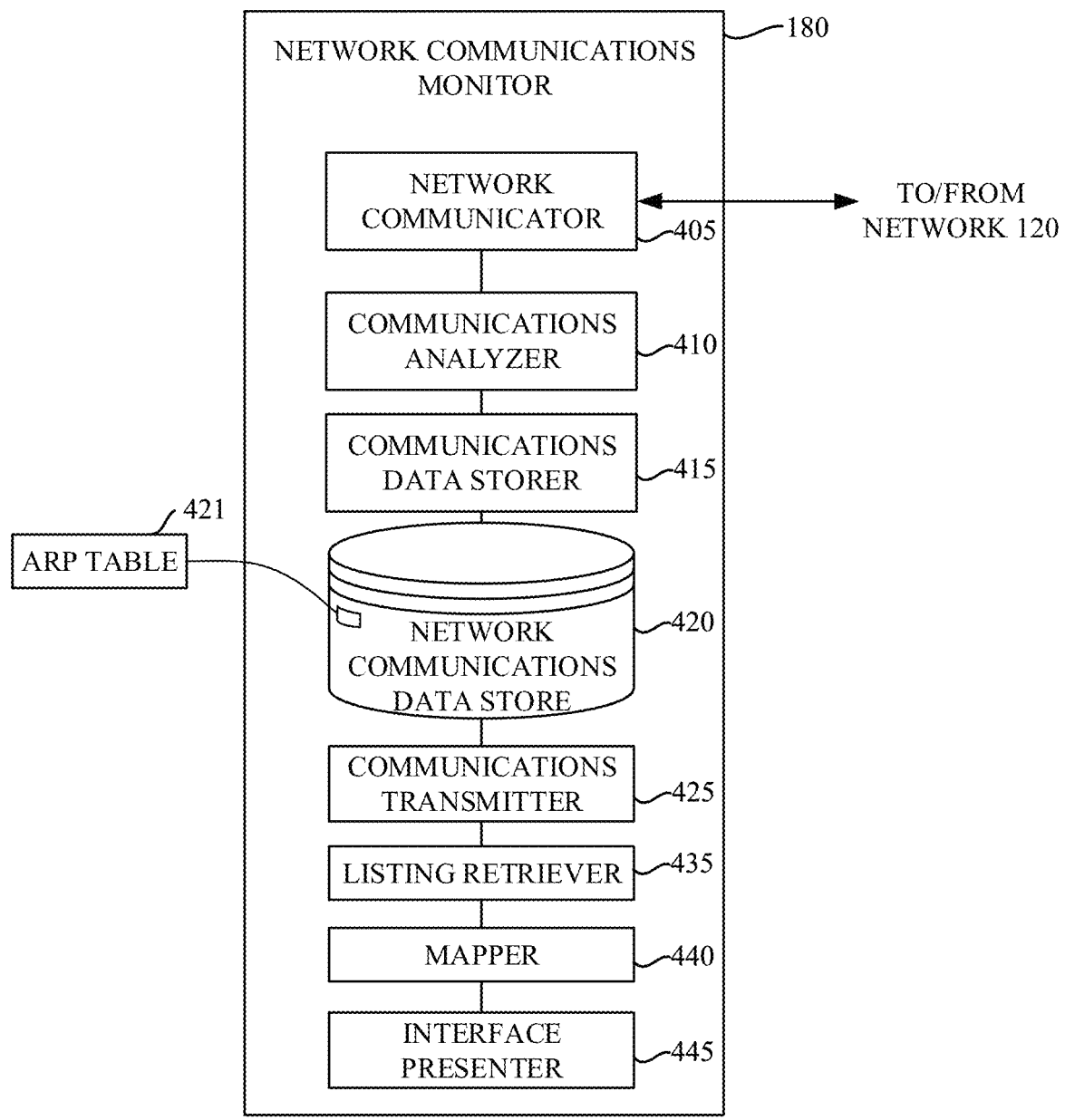
FIG. 4 is a block diagram of an example implementation of the network communications monitor of FIG. 1.

FIG. 4 is a block diagram of an example implementation of the network communications monitor 180 FIG. 1. The example network communications monitor 180 of FIG. 4 includes a network communicator 405, a communications analyzer 410, a communications data storer 415, a communications data store 420, a communications transmitter 425, a listing retriever 435, a mapper 440, and an interface presenter 445.

The network communicator 405 of the illustrated example of FIG. 4 is an Ethernet interface. In the illustrated example, the network communicator 410 receives network communications (e.g., HTTP requests, etc.) from the LAN 120. While in the illustrated example, the network communicator 405 is an Ethernet interface, any other type of interface may additionally or alternatively be used. For example, the network communicator 405 might include one or more of a Bluetooth interface, a WiFi interface, a digital subscriber line (DSL) interface, a T1 interface, etc. While in the illustrated example a single network communicator 405 is shown, any number and/or type(s) of network communicators may additionally or alternatively be used. For example, both a wired network communicator and a wireless network communicator may be used.

The communications analyzer 410 of the illustrated example of FIG. 4 inspects network communications received by the network communicator 405. In the illustrated example, the communications analyzer 410 filters network communications received by the network communicator 405 to identify network communications of the media devices 150. Further, the communications analyzer 410 identifies the media device 150 involved in the network communications. In examples disclosed herein, the communications analyzer 410 identifies the media device 150 by determining a MAC address of the media device 150. In examples disclosed herein, the example communications analyzer 410 passively monitors communications occurring on the LAN 120 to identify addresses currently in use (e.g., addresses associated with communications that occurred within a threshold period of time such as the last hour, the last day, the last week, etc.). However, in some examples, the example communications analyzer 410 may actively identify addresses in use on the LAN 120 by, for example, scanning a range of IP addresses, querying a DHCP server to identify IP addresses that have been leased, etc.

The communications data storer 415 of the illustrated example of FIG. 4 stores network communications identified by the communications analyzer 410 in the network communications data store 420. In the illustrated example, network communications identified by the communications analyzer 410 are stored in association with the media device(s) 150 identified as receiving and/or transmitting network communications.

The network communications data store 420 of the illustrated example of FIG. 4 may be any device for storing data such as, for example, flash memory, magnetic media, optical media, etc. Furthermore, the data stored in the network communications data store 420 may be in any data format such as, for example, binary data, comma delimited data, tab delimited data, structured query language (SQL) structures, etc. While, in the illustrated example, the network communications data store 420 is illustrated as a single database, the network communications data store 420 may be implemented by any number and/or type(s) of databases. In the illustrated example, the network communications data store 420 stores an ARP table 421 that includes mapping information between a network address (e.g., an IP address) and a hardware address (e.g., a MAC address) presently using the corresponding network address. An example implementation of the ARP table 421 is further described in connection with FIG. 4A.

The communications transmitter 425 of the illustrated example of FIG. 4 transmits network communications data stored in the network communications data store 420. The communications transmitter 425 of the illustrated example periodically and/or aperiodically transmits network communications data from the network communications data store 420 to the network activity measurement system 110. The example communications transmitter 425 may transmit the network communications data upon determining that the amount of network communications data stored in the network communication data store 420 has reached a threshold, and/or in response to a clock (e.g., a time limit specifying that network communications are transmitted once every day). Transmitting network communications every day ensures that there is little lag time between the occurrence of the network communications and the ability to analyze the network communications. However, the transmission may occur at any desired interval(s) such as, for example, transmitting once every hour, once every week, etc. In examples in which the transmission is triggered based on an amount of network communications data stored in the network communications data store 420, the transmission threshold might indicate that network communications should be transmitted if there is more than a threshold amount (e.g., one megabyte) of network communications data stored in the network communications data store 420. Any data storage amount may be used for such a trigger such as, for example, ten megabytes, one hundred megabytes, etc. Additionally or alternatively, multiple transmission thresholds may be present. For example, a threshold indicating that network communications data should be transmitted at least once a day and a threshold indicating that network communications data should be transmitted if more than one megabyte of network communications data is stored in the network communications data store 420 might be used.

In the illustrated example, the communications transmitter 425 transmits the network communications data via the LAN 120 and the Internet 125. However, the communications transmitter 425 may transmit network communications data via any other communication medium. For example, the network communications monitor 180 may be physically mailed to the network activity measurement system 110 and the communications transmitter 425 might transmit network communications data via, for example, a USB connection, a Bluetooth connection, a serial connection, a local area network (LAN), etc.

The example listing retriever 435 of the illustrated example of FIG. 4 gathers the list of device names associated with the media exposure measurement location 140 from the network activity measurement system 110 and provides the list to the mapper 440. In examples disclosed herein, the list of device names additionally includes metadata associated with each of the devices such as, for example, a location of the named device in the media exposure measurement location 140, a primary user of the device, a make and/or model of the device, etc. In examples disclosed herein, the list of device names is retrieved using a representational state transfer (REST) command transmitted to the server 111 of the network activity measurement system 110 using a hypertext transfer protocol HTTP request. However, any other approach for retrieving a list of device names and/or metadata associated therewith may additionally or alternatively be used.

The example mapper 440 of the illustrated example of FIG. 4 receives the list of device names from the listing retriever 435 and solicits user input to map each of the named devices to a MAC addresses of a device present on the LAN 120 via the interface presenter 445. In some examples, the example mapper 440 identifies one or more suggested mappings that are provided to the interface presenter 445 for presentation to the user. The example mapper 440 may identify the suggested mappings based on, for example, a listing of known MAC addresses in use on the LAN 120 (e.g., retrieved from the ARP table 421 of FIG. 4 and described further in connection with FIG. 4A), an organizationally unique identifier (OUI) portion of the MAC address as compared to a manufacturer of the device associated with the device name provided in the list of device names, (e.g., if the panelist identifies that they have an Apple device on their home network, devices having a MAC address matching an OUI associated with Apple may be suggested), an amount of recent network communications transmitted in connection with a MAC address (e.g., to identify a device, the panelist may cause the device to transmit and/or request data such that network activity can be used to identify the device), a site recently visited by the device, etc. In examples disclosed herein, suggested mappings are identified as a sorted list for presentation via the interface presenter. However, any other approach to suggesting a mapping between a user-provided device name to a MAC address may additionally or alternatively be used.

The example interface presenter 445 of the illustrated example of FIG. 4 provides a network accessible interface (e.g., a webpage) that is accessed via a separate device (e.g., a personal computer, a tablet computer, etc.). In some examples, the interface may be accessed by a same device (e.g., a network monitoring laptop). In examples disclosed herein, the interface presenter 445 receives selections and/or other input provided by an installer (e.g., a representative of a media monitoring entity (e.g., an audience measurement entity such as The Nielsen Company (US), LLC) and/or by a user of the media device. For each media device in the list of media devices retrieved by the listing retriever 435, the interface presenter 445 presents possible MAC addresses of devices present on the LAN 120 that could be mapped to the media device. The interface presenter 445 provides the selected input to the mapper 440, which relays the mapping to the network activity measurement system 110.

In operation, the example communications analyzer 410 monitors, via the network communicator 405, communications occurring on and/or involving a LAN 120 (e.g., a home network). The example communications data storer 415 stores the communications in the network communications data store 420. The communications transmitter 425 periodically and/or aperiodically transmits the stored communications to the network activity measurement system 110. The example listing retriever 435 retrieves, from the network activity measurement system 110, a list of device names identified to the network activity measurement system 110 as in use on the LAN 120. The example mapper 440 facilitates mapping of hardware addresses occurring on the LAN 120 to device names in the retrieved list of device names. The example mapper 440 transmits the list of device names to the network activity measurement system 110 to enable the network activity measurement system to create media exposure measurement reports using the device names and/or additional information concerning those named devices such as, for example, a primary user of the device, a location of the device, etc.

FIG. 4A is an example address resolution protocol (ARP) table 421 that may be stored by the example network communications data store of the example network communications monitor 180 of FIGS. 1, 2, 3, and/or 4 to associate an Internet protocol (IP) address with a hardware address (e.g., a media access control (MAC) address). The example ARP table 421 is maintained by the network communicator 405. The ARP table 421 is updated by the network communicator 405 as IP addresses of media devices change (e.g., new IP addresses are issued via DHCP).

The example ARP table 421 of FIG. 4A includes an IP address column 460 and a MAC address column 465. In the illustrated example, the IP address column 460 represents a IP version 4 (IPv4) addresses of media devices on the LAN. However, any other type of address may additionally or alternatively be used such as, for example, an IPv6 address. In the illustrated example, the MAC address column 465 represents MAC addresses of media devices on the LAN. However, any other type of address may additionally or alternatively be used. Each row of the ARP table 421 of FIG. 4A represents a specific media device (i.e., the IP address and MAC address of a single media device).

The example ARP table 421 of the illustrated example of FIG. 4A includes five rows respectively associated with five different media devices on the LAN. A first row 471 corresponds to the first media device 151. A second row 472 corresponds to the second media device 152. A third row 473 corresponds to the third media device 153. A fourth row 474 corresponds to the fourth media device 154. A fifth row 475 corresponds to the fifth media device 155. In the illustrated example, the first six characters of the MAC address (described above as the OUI) of the third row 473 and the fourth row 474 are the same (e.g., "4C:B1:99"). In the illustrated example, the matching OUI indicates that the third media device 153 and the fourth media device 154 are of the same manufacturer and/or model.

Figure 5:
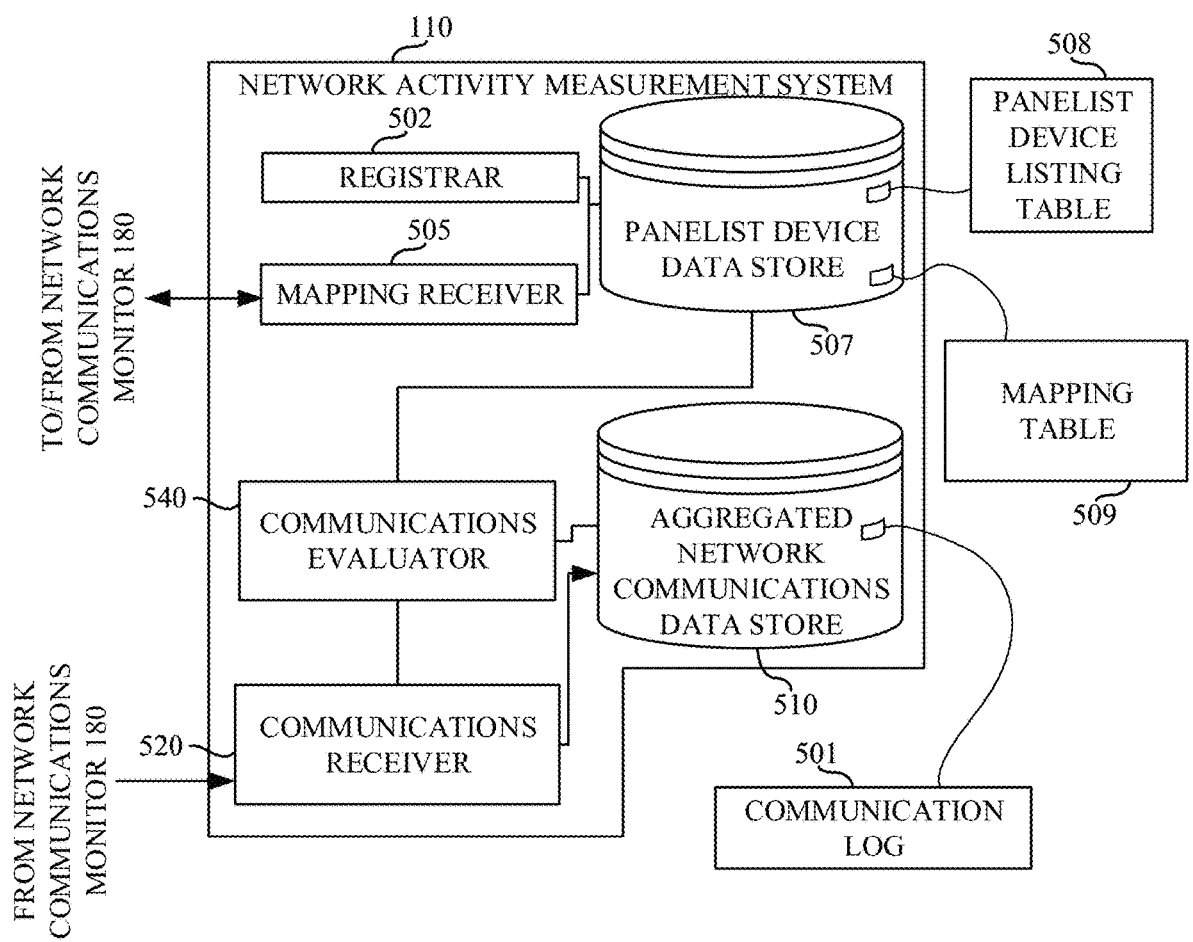
FIG. 5 is a block diagram of an example implementation of the network activity measurement system of FIG. 1.

FIG. 5 is a block diagram of an example implementation of the example network activity measurement system 110 of FIG. 1. The example network activity measurement system 110 of FIG. 5 includes a registrar 502, a mapping receiver 505, a panelist device data store 507, a communications receiver 520, a communications evaluator 540, and an aggregated network communications data store 510.

The example registrar 502 of the illustrated example of FIG. 5 receives panelist registration information and stores the received information in the panelist device listing table 508 of the panelist device data store 507. In some examples, the example registrar 502 collects a list of device names when the panelist enrolls in the panel (e.g., the panelist provides a list of devices present in the panelist household). In such examples, the panelist and/or installer may name the devices within their household and/or provide some additional properties about the device. For example, the panelist and/or installer may provide information concerning the location of the device within the panelist household (e.g., in the living room, in the basement, etc.), the main user of the device, a manufacturer of the device, etc. Such information is stored in the panelist device listing table 508 described below in connection with the panelist device data store 507.

The example mapping receiver 505 of the illustrated example of FIG. 5 receives mappings identified by the mapper 440 of the example network communications monitor 180 of FIG. 4. In examples disclosed herein, each mapping identifies a MAC address of a device and its corresponding device name stored in the panelist device listing table 508. In examples disclosed herein, the mapping is stored in the mapping table 509 described below in connection with the panelist device data store 507.

The example panelist device data store 507 of the illustrate example of FIG. 5 may be implemented by any type(s) and/or number of device(s) and/or storage disks for storing data such as, for example, flash memory, magnetic media, optical media, etc. Furthermore, the data stored in the example panelist device data store 507 may be in any data format(s) such as, for example, binary data, comma delimited data, tab delimited data, structured query language (SQL) structures, etc. While, in the illustrated example, the panelist device data store 507 is illustrated as a single database, the panelist device data store 507 may be implemented by any number and/or type(s) of databases. In the illustrated example, the example panelist device data store 507 stores a panelist device listing table 508 and a mapping table 509.

FIG. 5A is an example data table that may be stored by the example panelist device data store 507 of FIG. 5 to store a list of panelist devices and additional properties associated therewith. The example panelist device listing table 508 stores a device name (device name column 571) and additional properties of the corresponding device such as, for example, a location of the device (site ID column 572), a type of the device (type column 573), a make of the device (make column 574), a model of the device (model column 575), whether metering and/or monitoring of the network communications device is permitted (metered column 576), whether the device is portable and/or movable (moveable column 577). In some examples, additional information is stored such as, for example, a household identifier and/or an identifier of the network communications monitor 180 to facilitate association of the device(s) with the household (e.g., multiple panelist households may have a device named "tablet", "television", "smartphone", etc.). In some examples, one or more panelist identifier(s) may be included representing one or more users of the device (e.g., both Isabelle and Elizabeth might use the Google TV device of row 582, whereas only Isabelle might use the Xbox of row 584, etc.). In the illustrated example of FIG. 5A, the example panelist device listing table 508 includes four rows 581, 582, 583, 584. However, in practice, any number of rows may be used corresponding to a number of device names provided to the registrar 502.

FIG. 5B is an example data table that may be stored by the example panelist device data store 507 of FIG. 5 to store a mapping between a MAC address and a device name. The example mapping table 509 stores a MAC address (MAC address column 591) and a device name (device name column 592) corresponding to each mapping provided to the mapping receiver 505. In some examples, additional information such as a time at which the mapping was created, an identifier of the user that entered the mapping, etc. In the illustrated example of FIG. 5B, four mappings are shown 595, 596, 597, 598. However, in practice, any number of mappings may be stored corresponding to a number of mappings received by the mapping receiver 505.

Returning to FIG. 5, the communications receiver 520 of the illustrated example of FIG. 5 receives network communications data from the example network communications monitor 180 shown in FIGS. 1, 2, 3, and/or 4. In the illustrated example, the communications receiver 520 is implemented by a server which receives the network communications from the network communications monitor 180 via a network interface (e.g., an Ethernet connection). However, the communications receiver 520 may receive the network communications from the network communications monitor 180 via any other type of interface such as, for example, a universal serial bus (USB) connection, a Bluetooth connection, etc. The communications receiver 520 of the illustrated example stores the received network communications in the aggregated network communications data store 510.

The aggregated network communications data store 510 of the illustrated example of FIG. 5 may be implemented by any type(s) and/or number of device(s) and/or storage disks for storing data such as, for example, flash memory, magnetic media, optical media, etc. Furthermore, the data stored in the aggregated network communications data store 510 may be in any data format(s) such as, for example, binary data, comma delimited data, tab delimited data, structured query language (SQL) structures, etc. While, in the illustrated example, the aggregated network communications data store 510 is illustrated as a single database, the network communications data store 510 may be implemented by any number and/or type(s) of databases. In the illustrated example, the example network communications data store 510 stores a communication log 501. Records in the example communication log 501 are transmitted to the network activity measurement system 110 by the network communications monitor 180. Data stored in the aggregated network communications data store 510 is aggregated in the sense that it represents an aggregate of network communications data received from each network communications monitor 180. In the illustrated example, for simplicity, the communication log 501 represents communications received from a single network communications monitor 180 (e.g., network communications monitored at a single media exposure measurement location 140). However, in practice, the communication log 501 may represent communications received from multiple network communications monitors 180, associated with many different media exposure measurement locations 140.

In the illustrated example, the communication log 501 stores information such as, for example, the MAC address of the media device involved in the communication, a timestamp indicating when the network communication occurred, and/or network data representing the network communication (e.g., an HTTP headers of network communications monitored by the network communications monitor 180, an HTTP payload, FTP data, HTTPS data, etc.) However, any other information may additionally or alternatively be stored such as, for example, a payload of the network communication.

The communications evaluator 540 of the illustrated example of FIG. 5 analyzes communications from the network devices 150 (received via the network communications monitor 180 and the communications receiver 520). The example communications evaluator 540 of FIG. 5 is implemented by a server which analyzes the communications from the media devices 150 stored in the communication log 501 to determine, for example, ownership and/or usage statistics of the media devices 150, relative rankings of usage and/or ownership of media devices 150, type(s) of uses of media devices 150 (e.g., whether a device is used for browsing the Internet, streaming media from the Internet, etc.), and/or other type(s) of network device information. In some examples, the example communications evaluator 540 utilizes the mapping received via the mapping receiver 505 and stored in the panelist device data store 507 to connect a MAC address of a network communication stored in the communication log 501 with a device name and, in some examples, with device metadata provided by the panelist (e.g., a location of the device in the media exposure measurement location 140, a primary user of the device, etc.) When used in combination, such information may be used to determine whether, for example, a particular program is more commonly viewed at a particular location in the media exposure measurement location 140 (e.g., child oriented media is more commonly viewed in a family room as opposed to a basement, etc.).

While an example manner of implementing the network activity measurement system 110 of FIG. 1 has been illustrated in FIG. 5 and an example manner of implementing the network communications monitor 180 of FIG. 1 has been illustrated in FIG. 4, one or more of the elements, processes and/or devices illustrated in FIGS. 4 and/or 5 may be combined, divided, re-arranged, omitted, eliminated and/or implemented in any other way. Further, the example network communicator 405, the example communications analyzer 410, the example communications data storer 415, the example network communications data store 420, the example communications transmitter 425, the example listing retriever 435, the example mapper 440, the example interface presenter 445, and/or, more generally, the example network communications monitor 180 of FIGS. 1, 2, 3, and/or 4, and/or the example registrar 502, the example mapping receiver 505, the example panelist device data store 507, the example aggregated network communications data store 510, the example communications receiver 520, the example communications evaluator 540, and/or, more generally, the example network activity measurement system 110 of FIGS. 1 and/or 5 may be implemented by hardware, software, firmware and/or any combination of hardware, software and/or firmware. Thus, for example, any of the example network communicator 405, the example communications analyzer 410, the example communications data storer 415, the example network communications data store 420, the example communications transmitter 425, the example listing retriever 435, the example mapper 440, the example interface presenter 445, and/or, more generally, the example network communications monitor 180 of FIGS. 1, 2, 3, and/or 4, and/or the example registrar 502, the example mapping receiver 505, the example panelist device data store 507, the example aggregated network communications data store 510, the example communications receiver 520, the example communications evaluator 540, and/or, more generally, the example network activity measurement system 110 of FIGS. 1 and/or 5 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network communicator 405, the example communications analyzer 410, the example communications data storer 415, the example network communications data store 420, the example communications transmitter 425, the example listing retriever 435, the example mapper 440, the example interface presenter 445, and/or, more generally, the example network communications monitor 180 of FIGS. 1, 2, 3, and/or 4, and/or the example registrar 502, the example mapping receiver 505, the example panelist device data store 507, the example aggregated network communications data store 510, the example communications receiver 520, the example communications evaluator 540, and/or, more generally, the example network activity measurement system 110 of FIGS. 1 and/or 5 is/are hereby expressly defined to include a tangible computer readable storage device or storage disk such as a memory, a digital versatile disk (DVD), a compact disk (CD), a Blu-ray disk, etc. storing the software and/or firmware. Further still, the example network activity measurement system 110 of FIGS. 1 and/or 5, and/or the example network communications monitor 180 of FIGS. 1, 2, 3, and/or 4 may include one or more elements, processes and/or devices in addition to, or instead of, those illustrated in FIGS. 1, 4, and/or 5, and/or may include more than one of any or all of the illustrated elements, processes and devices.

Figure 6:
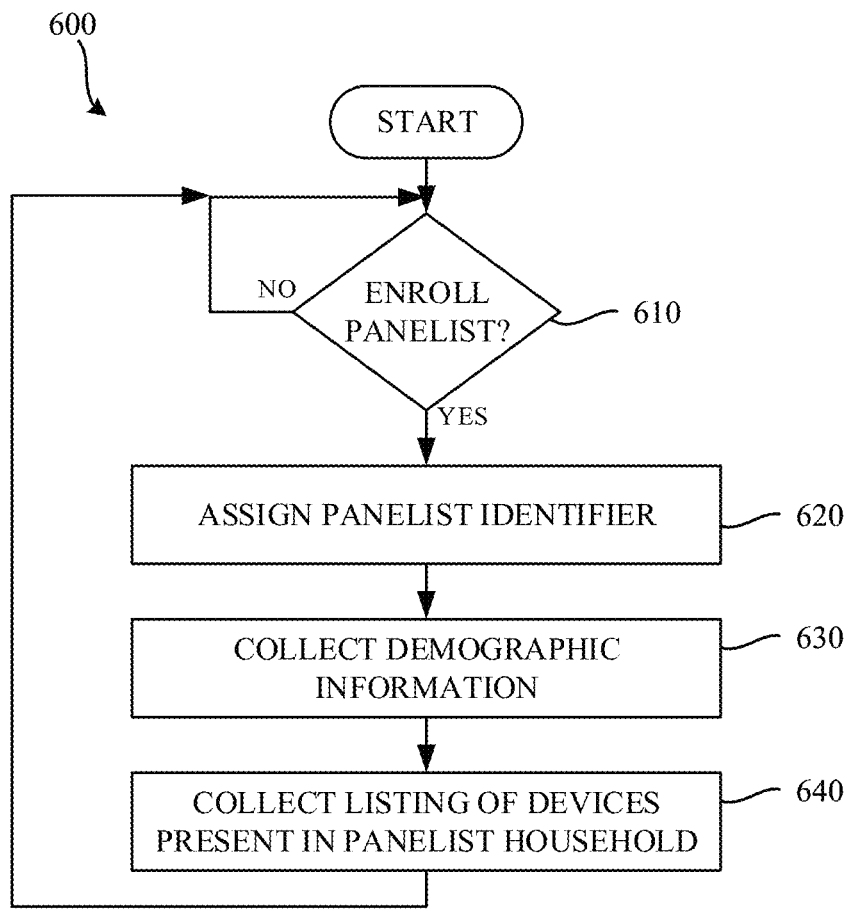
FIG. 6 is a flowchart representative of example machine-readable instructions which may be executed to implement the example network activity measurement system of FIGS. 1 and/or 5 to enroll a panelist.
Figure 7:
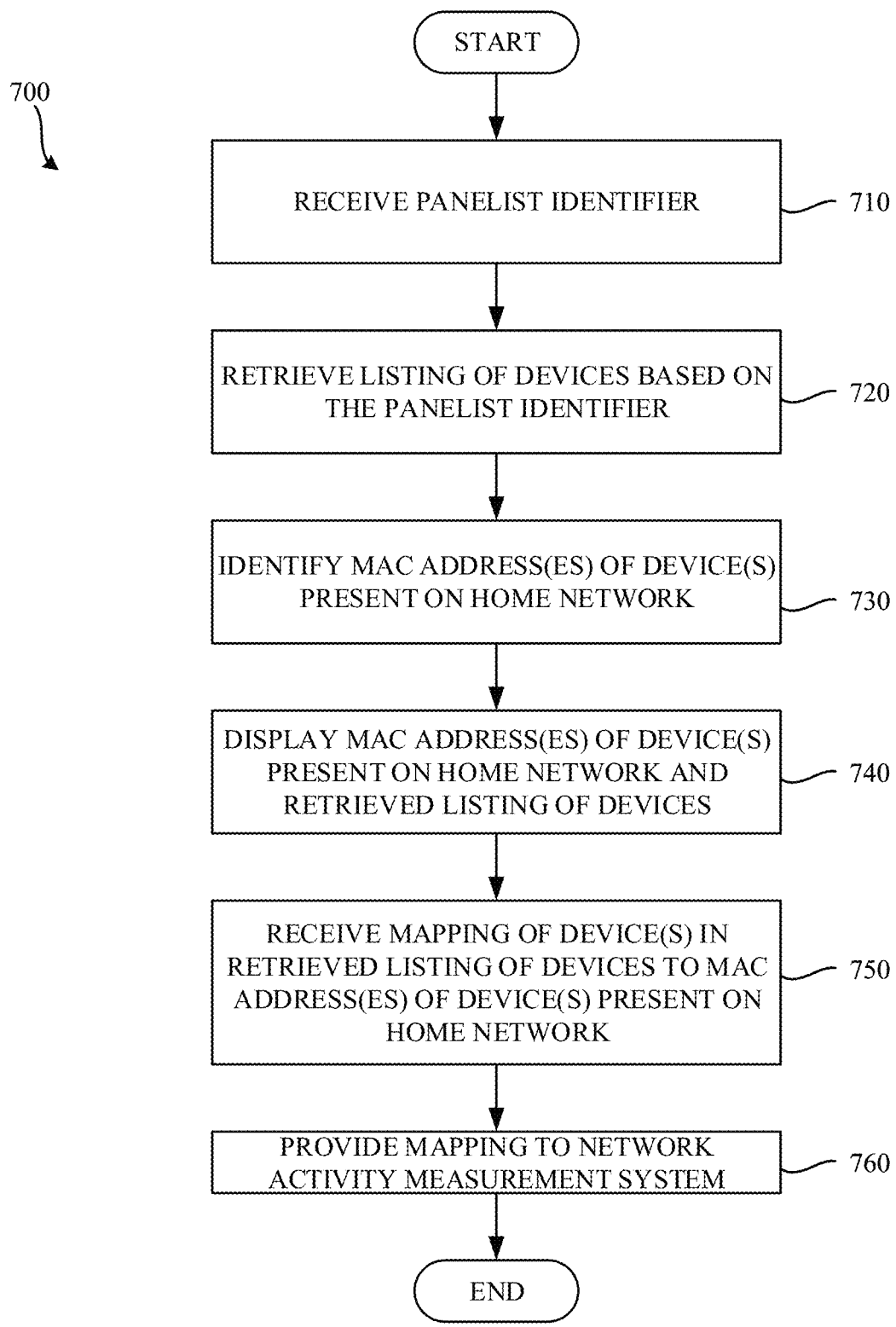
FIG. 7 is a flowchart representative of example machine readable instructions which may be executed to implement the example network communications monitor of FIGS. 1, 2, 3, and/or 4 to facilitate mapping of devices in the panelist household to device names.
Figure 9:
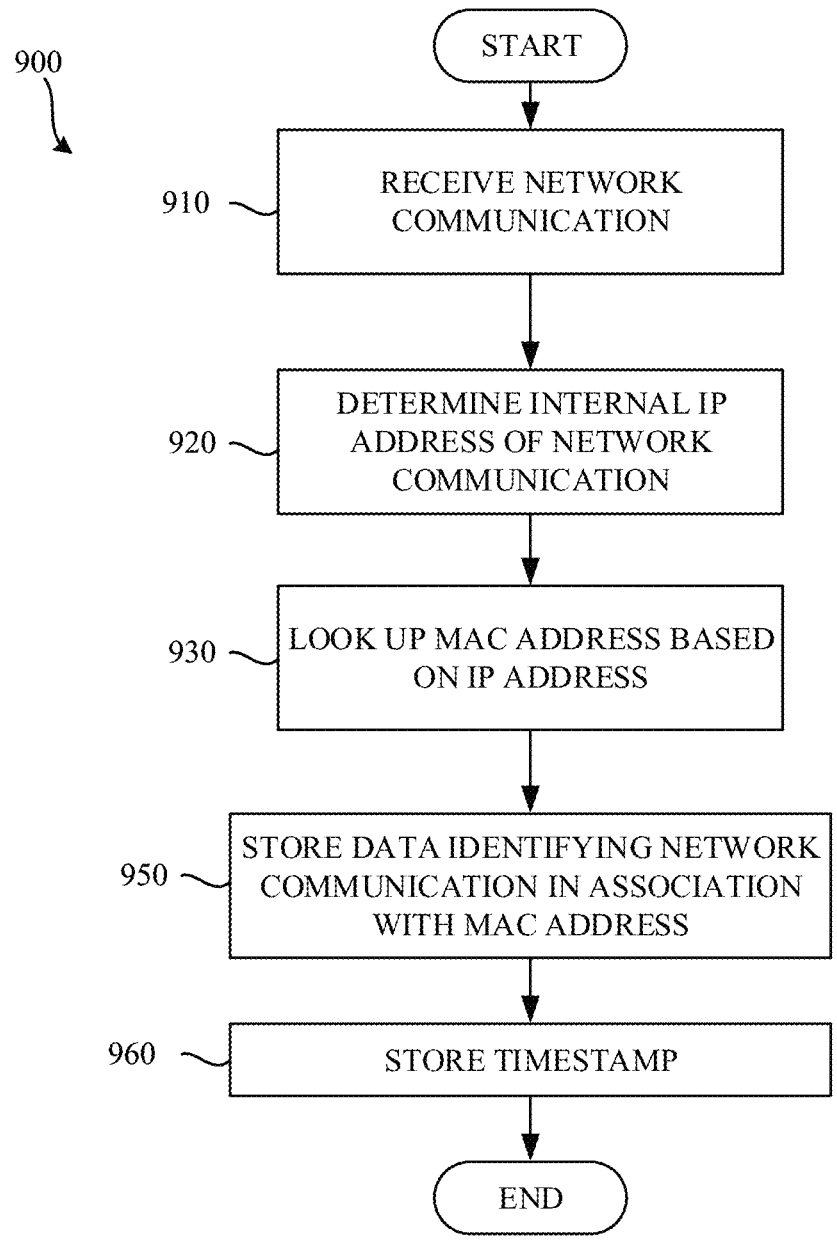
FIG. 9 is a flowchart representative of example machine-readable instructions which may be executed to implement the example network communications monitor of FIGS. 1, 2, 3, and/or 4 to identify network communications.

Flowcharts representative of example machine readable instructions for implementing the example network communications monitor 180 of FIGS. 1, 2, 3, and/or 4 are shown in FIGS. 7, 9, and/or 10. Flowcharts representative of example machine readable instructions for implementing the example network activity measurement system 110 of FIGS. 1 and/or 5 are shown in FIGS. 6 and/or 11. In these examples, the machine readable instructions comprise a program for execution by a processor such as the processor 1212 shown in the example processor platform 1200 discussed below in connection with FIG. 12 or the processor 1312 shown in the example processor platform 1300 discussed below in connection with FIG. 13. The program(s) may be embodied in software stored on a tangible computer readable storage medium such as a CD-ROM, a floppy disk, a hard drive, a digital versatile disk (DVD), a Blu-ray disk, or a memory associated with the processor 1212, or a memory associated with the processor 1312, but the entire program and/or parts thereof could alternatively be executed by a device other than the processor 1212, the processor 1312, and/or embodied in firmware or dedicated hardware. Further, although the example program(s) is/are described with reference to the flowcharts illustrated in FIGS. 6, 7, 9, 10, and/or 11, many other methods of implementing the example network activity measurement system 110 of FIGS. 1 and/or 5, and/or the example network communications monitor 180 of FIGS. 1, 2, 3, and/or 4 may alternatively be used. For example, the order of execution of the blocks may be changed, and/or some of the blocks described may be changed, eliminated, or combined.

As mentioned above, the example processes of FIGS. 6, 7, 9, 10, and/or 11 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 6, 7, 9, 10, and/or 11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

FIG. 6 is a flowchart representative of example machine-readable instructions 600 which may be executed to implement the example network activity measurement system 110 of FIGS. 1 and/or 5. The example machine-readable instructions 600 of FIG. 6 begin when the example registrar 502 identifies that a panelist is to be enrolled (block 610). If a panelist is not to be enrolled (block 610 returns a result of NO), the example registrar 502 waits until a panelist is to be enrolled. If the panelist is to be enrolled in a panel (block 610 returns a result of YES), the example registrar 502 assigns a panelist identifier (block 620). In examples disclosed herein, the panelist identifier is an identifier of the panelist household (e.g., the media exposure measurement location 140). However, in some examples, multiple panelist identifiers may be generated for different members (e.g., panelists) within a panelist household. The example registrar 502 collects demographic information about the panelist(s) (Block 630). In examples disclosed herein, the demographic information may be collected via, for example, a survey on a web site, via a telephonic call, etc. The example registrar 502 stores the collected panelist demographic information in the example panelist device data store 507.

The example registrar 502 collects a listing of devices present in the panelist household (block 640). In examples disclosed herein, a user (e.g., the panelist, an installer, a representative of the audience measurement entity, etc.) enters the listing of panelist devices into the registrar 502 using a web interface (e.g., a webpage). However, any other approach to providing a list of devices may additionally or alternatively be used. In some examples, additional information concerning the devices identified in the list is collected. For example, information concerning a location of the device, a type of the device, a make of the device, a model of the device, whether metering and/or monitoring of the network communications device is permitted, whether the device is portable and/or movable, etc. The collected list of devices and/or the additional information associated therewith is stored in the example panelist device data store 507. The example process of FIG. 6 is then repeated, and the registrar 502 continues to wait for subsequent panelists to enroll. In the illustrated example of FIG. 6, the panelist enrollment process is performed serially (e.g., one panelist at a time). However, any other approach may additionally or alternatively be used to facilitate simultaneous enrollment of multiple panelists.

FIG. 7 is a flowchart representative of example machine readable instructions 700 which may be executed to implement the example network communications monitor 180 of FIGS. 1, 2, 3, and/or 4 to facilitate mapping of devices in the panelist household to device names. The example process of FIG. 7 begins when a panelist identifier is presented via the interface presenter 445 to the listing retriever 435. In examples disclosed herein, the panelist identifier is an identifier of the household and is used to differentiate one household from another. However, any other type of identifier (e.g., an identifier that is specific to a particular user within the panelist household) may additionally or alternatively be used. In examples disclosed herein, the identifier is provided via the interface presenter (e.g., a web page). However, in some examples, the identifier may be stored in a memory of the network communications monitor 180. In such an example, during an initial installation and/or configuration of the network communications monitor 180, the identifier may be provided and, subsequently, may not need to be provided.

Using the panelist identifier, the example listing retriever 435 retrieves the listing of devices from the mapping receiver 505. In examples disclosed herein, the retrieved listing includes device names and any additional metadata associated with the device. In some examples, MAC addresses associated with any device names that have already been mapped are also provided prevent double mapping to a MAC address, and/or facilitate corrections of existing mappings. In some examples, only device names that have not yet ben mapped are retrieved.

The example mapper 440 identifies MAC addresses of device(s) present on the LAN 120 (block 730). In examples disclosed herein, the MAC addresses are identified by consulting the ARP table 421. However, any other approach to identifying MAC addresses in use on the network may additionally or alternatively be used.

The example mapper 440 displays, via the interface presenter 445, an interface listing the identified MAC addresses of devices present on the LAN 120, and devices in the retrieved listing of devices (block 740). FIG. 8 is an example interface 800 that may be presented by the example interface presenter of the example network communications monitor of FIGS. 1, 2, 3, and/or 4 to facilitate mapping of devices in the panelist household to device names. The example interface 800 includes a device map table 810 that identifies each of the devices included in the listing of retrieved at block 720. The example device map 810 includes four rows 815, 820, 825, 830 corresponding to the four rows of the example panelist device listing table 508 of FIG. 5A. The example device map 810 includes a fifth row 835 to facilitate addition of a new device name by the user. The example MAC address column includes a button 832 for each unmapped row that, when selected, enables display of a listing of unmapped devices 850. The listing of unmapped devices provides suggested mappings that might be used for the selected device name (e.g., the selected row of the device map table 810). In examples disclosed herein, suggested mappings are identified based on, for example, an organizationally unique identifier (OUI) portion of the MAC address as compared to a make/model of the device associated with the device name as identified by the panelist and/or installer (e.g., if the panelist identifies that they have an Apple device on their home network, devices having a MAC address matching an OUI associated with Apple may be suggested), an amount of recent network communications transmitted in connection with a MAC address (e.g., to identify a device, the panelist may cause the device to transmit and/or request data such that network activity can be used to identify the device), a recent domain name involved in network communications associated with the MAC address, etc. In examples disclosed herein, suggested mappings are identified as a sorted list. However, any other approach to suggesting a mapping between a user-provided device name to a MAC address may additionally or alternatively be used.

The example interface presenter 445 enables the user to select a MAC address to be associated with a device name. In some examples, the mapping is facilitated in the other direction as well (e.g., enabling a user to select a device name to be associated with a MAC address). Based on user selections received by the interface presenter 445, the example mapper 440 receives one or more mappings of a device name to a MAC address (block 750). The received mappings are provided to the example network activity measurement system 110 (block 760). Upon providing the mappings to the network activity measurement system, the mappings are stored in the example mapping table 509.

FIG. 9 is a flowchart representative of example machine-readable instructions 900 which may be executed to implement the example network communications monitor 180 of FIGS. 1 and 4 to monitor network communications. The machine-readable instructions 900 of FIG. 9 begin execution when the network communicator 405 receives network communications (block 910). In the illustrated example, the network communicator 405 receives network communications sent to and/or from a device (e.g., the device 150) on the LAN 120.

The communications analyzer 410 then determines the internal IP address of the media device involved in the network communication (block 920). In some examples, the media device may be the source (e.g., the originator) of the network communication, while in some other examples the media device may be the destination of the network communication. In the illustrated example, the communications analyzer 410 identifies the IP address by selecting an internal IP address involved in the communications. In some examples, the network communication may involve both a source and a destination that are internal to the LAN 120 (e.g., a first media device on the LAN communicates with a second media device on the LAN). In such examples, the communications analyzer 410 may ignore the network communication. However, in some examples, the communications analyzer 410 may select the IP address of the source of the network communication as the IP address.

The communications analyzer 410 then performs a lookup of the MAC address based on the IP address (block 930). In the illustrated example, the communications analyzer 410 performs the lookup via the ARP table 421. The ARP table is maintained by the example network communicator 405 of the network communications monitor 180. However, any other approach to determining the MAC address of the IP address associated with the network communications may be used. The example communications analyzer 410 stores the data identifying the network communication in association with the MAC address in the network communications data store 420 (block 950).

In the illustrated example, the communications analyzer 410 timestamps the network communications stored in the network communications data store 410 (block 960). Timestamping (e.g., recording a time that an event occurred) enables accurate identification and/or correlation of media that was presented.

In some examples, the communications analyzer 410 inspects the network communications to identify HTTP communications. That is, the communications analyzer 410 and/or the communications data storer 415 may store network communications only when the communications are HTTP communications. In such an example, the HTTP communications are stored in the network communications data store 420 by the communications data storer 415. In some examples, the communications analyzer 410 inspects the network communications to identify a type and/or protocol of network communication (e.g., HTTP communications, DNS communications, SIP communications, FTP communications, etc.) by for example, inspecting a header of network communication (e.g., a transmission control packet (TCP) header, a user datagram protocol (UDP) header). In some examples, the communications analyzer 410 inspects the network communications to identify a source and/or a destination of the network communications by for example, inspecting a header of network communication (e.g., a transmission control packet (TCP) header, a user datagram protocol (UDP) header). In such an example, communications might only be stored when they are requests transmitted to particular providers of Internet services (e.g., Netflix®, YouTube®, Hulu®, Pandora®, Last.fm®, etc.) and/or when the communications originated from a particular type of network device (e.g., an Internet enabled television, a video game console, etc.), depending on the nature of the study.

In some examples, the communications analyzer 410 processes the received network communications to identify particular portion(s) of the network communications. For example, to reduce the amount of storage space required to store the network communications, the communications analyzer 410 may remove and/or compress one or more portion(s) of the network communications.

Figure 10:
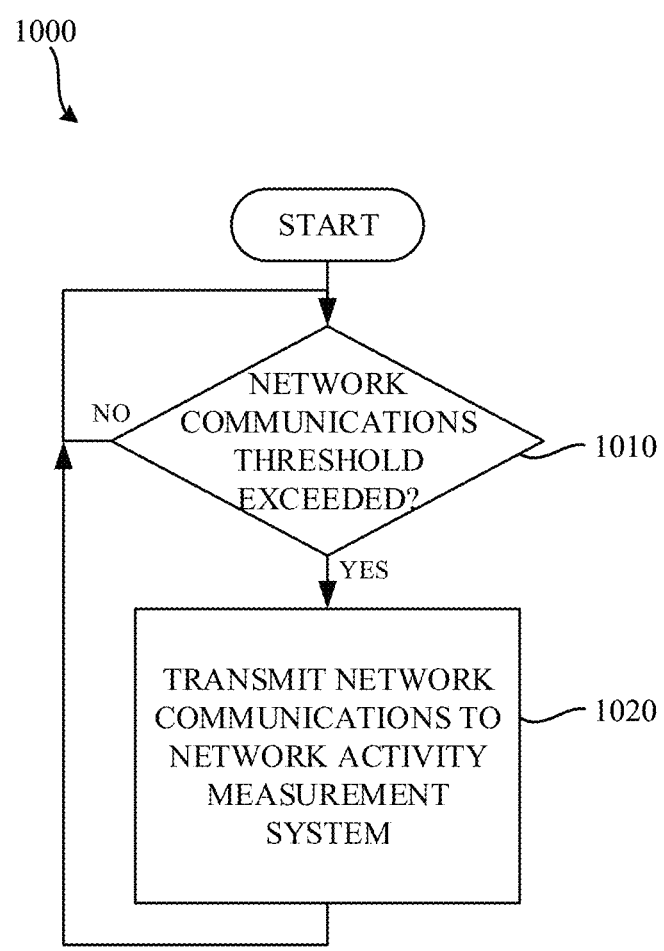
FIG. 10 is a flowchart representative of example machine-readable instructions which may be executed to implement the example network communications monitor of FIGS. 1, 2, 3, and/or 4 to transmit stored network communications to the network activity measurement system of FIGS. 1 and/or 5.

FIG. 10 is a flowchart representative of example machine-readable instructions 1000 which may be executed to implement the example network communications monitor 180 of FIGS. 1, 2, 3, and/or 4 to transmit stored network communications. The machine-readable instructions 1000 of FIG. 10 begin execution at block 1010 when the communications transmitter 425 determines whether a network communications threshold has been exceeded (block 1010). In the illustrated example, the threshold is a time limit specifying that network communications are transmitted once every day. Additionally or alternatively, any other periodic and/or aperiodic approach to transmitting network communications from the network communications monitor 180 may be used. For example, the network communications threshold might be based on an amount of network communications data stored in the network communications data store 420.

If the network communications threshold has not been exceeded (block 1010), the communications transmitter 425 continues to determine whether the data identifying the network communications have exceeded the network communications threshold. When the network communications threshold has been exceeded (block 1010), the communications transmitter 425 transmits the data identifying the network communications to the network communications data receiver 520 of the network activity measurement system 110 as a log of network activity (block 1020). In the illustrated example, the data identifying the network communications is transmitted in association with an identifier of the network communications monitor 180. The identifier of the network communications monitor 180, in some examples, enables identification of the source of network communications analyzed by the communications evaluator 540 of the network activity measurement system 110.

In the illustrated example, the communications transmitter 425 transmits the stored network communications via the network communicator 405. However, in some examples, the communications transmitter 425 transmits the stored network communications via a local connection such as, for example, a serial connection, a universal serial bus (USB) connection, a Bluetooth connection, etc. In some examples, the network communications monitor 180 may be physically moved to a location of the network activity measurement system 110 by, for example, physically mailing the network communications monitor 180, etc.

Figure 11:
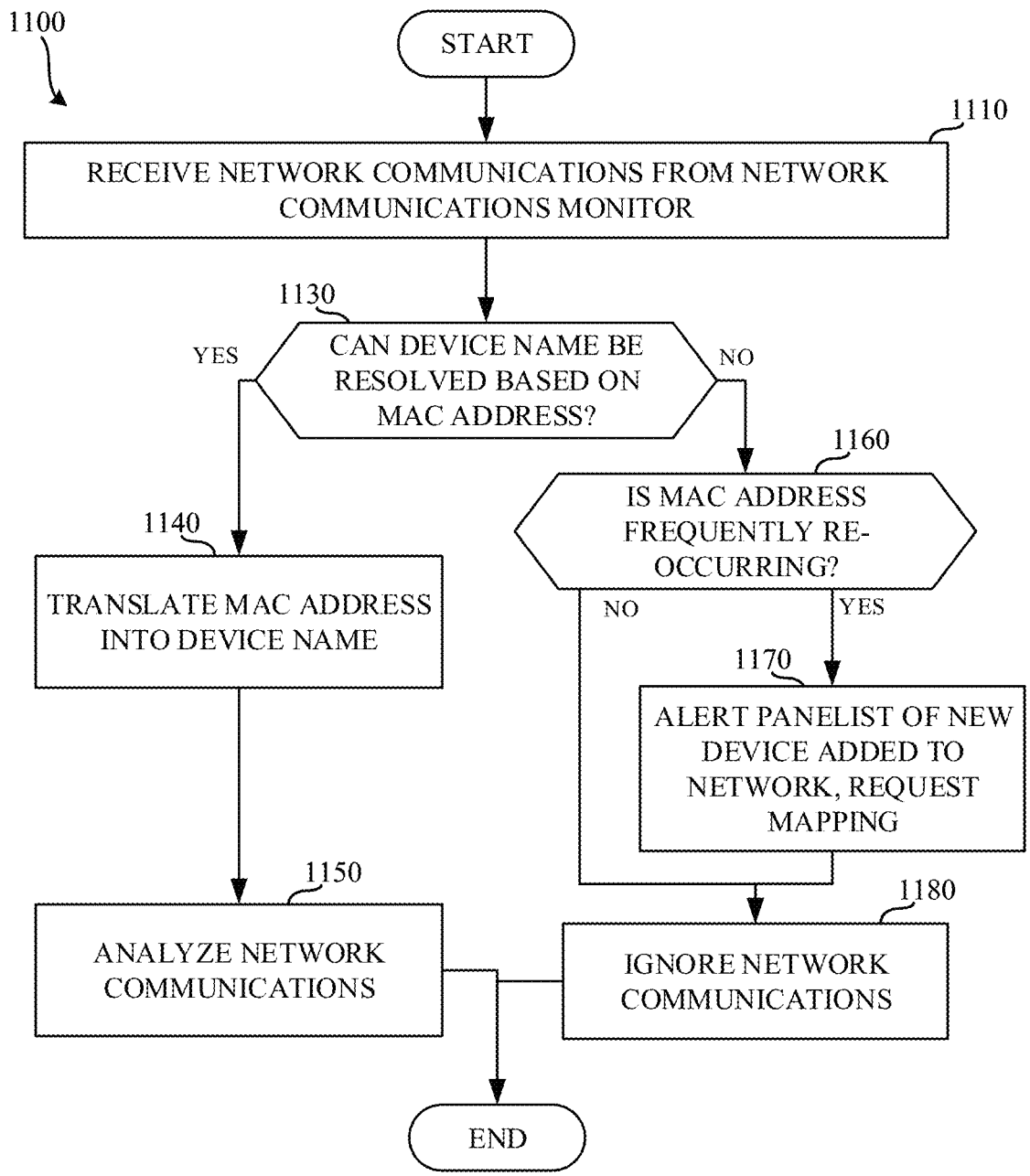
FIG. 11 is a flowchart representative of example machine-readable instructions which may be executed to implement the example network activity measurement system of FIGS. 1 and/or 5 to identify media devices.

FIG. 11 is a flowchart representative of example machine-readable instructions 1100 which may be executed to implement the example network activity measurement system 110 of FIGS. 1 and/or 5 to receive and analyze network communications. The machine-readable instructions 1100 of FIG. 11 begin execution when the communications receiver 520 receives network communications from the network communications monitor (block 1110). In the illustrated example, the network communications are received from the network communications monitor 180 via a network connection, such as, for example, the Internet 125. However, the network communications data may be received in any other fashion. For example, the network communications data may be received via a universal serial bus (USB) connection. In such an example, the network communications monitor 180 may be mailed to a location of the network activity measurement system 110. Additionally or alternatively, a storage device (e.g., a memory stick, a compact disk, a hard disk drive, etc.) may be mailed and/or otherwise sent to the network activity measurement system. Upon receiving the network communications data, the communications receiver 520 stores the network communications in the aggregated network communications data store 510. In examples disclosed herein, the network communications are received as a log of network communications.

Each record of the example log of network communications 501 of FIG. 5 identifies a network communication in association with a MAC address. In some examples, a panelist household identifier may be included to facilitate an association of the log of network communications with the network communications monitor 180 that monitored those communications and/or the media exposure measurement location 140 in which the communications were monitored.

Upon receipt of the log of network communications (and/or at a later time), the example communications evaluator 540 determines whether a device name can be resolved based on the MAC address (block 1130). In examples disclosed herein, the example communications evaluator 540 performs a lookup against the example mapping table 509 stored in the example panelist device data store 507 of FIG. 5. Mappings between a MAC address and a device name are provided to the network activity measurement system 110 by the example network communications monitor 180 in connection with block 760 of FIG. 7. If the MAC address exists in the mapping table 509, the example communications evaluator 540 translates the MAC address into a device identifier by performing a lookup of the device name based on the MAC address using the mapping table 509 (block 1140). In some examples, the MAC address is not translated, but instead is retained and is supplemented by the device name. The network communications are analyzed by the example communications evaluator 540 using the device name and, in some examples, the additional metadata provided in connection with the device during the registration process described in connection with FIG. 6 (block 1150).

Returning to block 1130, in some examples, a MAC address may appear in a log of network communications that does not exist in the mapping table 509. In such an example, the device name will not be able to be resolved based on the MAC address (block 1130 will return a result of NO). If the device name cannot be resolved based on the MAC address (block 1130 returns a result of NO), the example communications evaluator 540 determines whether the MAC address is frequently re-occurring in logs of network communications received from the same panelist household (block 1160). MAC addresses that are not frequently re-occurring might not belong to device owned by the panelist. That is, such MAC addresses are likely used by a guest that temporarily used the LAN 120. The example communications evaluator 540 determines whether the MAC address is frequently re-occurring by identifying a number of times that the MAC address was reported by the network communications monitor 180 in prior communications logs (e.g., logs representing previous days of network communications). In examples disclosed herein, a MAC address is considered to be frequently re-occurring when it is identified in five of the past seven days of network communications. Of course, any other threshold and/or approach to determining whether a MAC address is frequently re-occurring may additionally or alternatively be used.

If the device name cannot be resolved based on the MAC address (block 1130 returns a result of NO) and the MAC address is frequently occurring (block 1160 returns a result of YES), an alert is generated by the communications evaluator 540 (block 1170). In some examples, the alert is transmitted to the panelist (e.g., via an email, via an SMS message), to inquire about the new device. Additionally or alternatively, the alert may be transmitted to a representative of the audience measurement entity such that the representative may contact the panelist to inquire about the new device. In the illustrated example, the alert identifies the MAC address that was identified to facilitate identification of the device and, in some examples, an identifier of the network communications monitor 180, so that the monitoring entity associated with the network activity measurement system 110 can contact the correct panelist and/or household regarding the newly added device. If, for example, the panelist confirms that a new device has been added, a device name may be added to the panelist device listing table 508. Upon a subsequent use of the example interface presenter 445, the list (including the new device name) will be retrieved and used in the interface for creating a mapping between the MAC address of the device and the device name. In some examples, the MAC address (identified as a result of the frequency of re-occurrence) and device name (identified by the panelist) are provided and can be stored directly in the mapping table 509. In some examples, an installer may be dispatched to the media exposure measurement location 140 to identify the new media device 150 and/or the MAC address of the new media device 150 and use the example interface presenter 445 to create a mapping between the device name and MAC address.

Returning to block 1160, if the MAC address is not frequently occurring (block 1160 returns a result of NO), the alert is not generated. In examples disclosed herein, if the device identifier cannot be resolved (block 1130 returns a result of NO), the network communications are ignored (block 1180). Ignoring the network communications ensures that panelists are not mis-credited for network communications of a guest user of their LAN. However, in some examples, the network communications may be re-processed at a later time, as the MAC address of the device may be later found to be re-occurring and a mapping may be created. In some examples, the network communications may be analyzed (instead of ignored). Such analysis might not be able to supply detailed information concerning the device (e.g., the primary user of the device, a location of the device in the household, etc.), but does enable identification of such communications as guest communications. In some examples, other techniques to supplement data may additionally be used such as, for example, identification of a manufacturer of the device based on an OUI portion of the MAC address.

Figure 12:
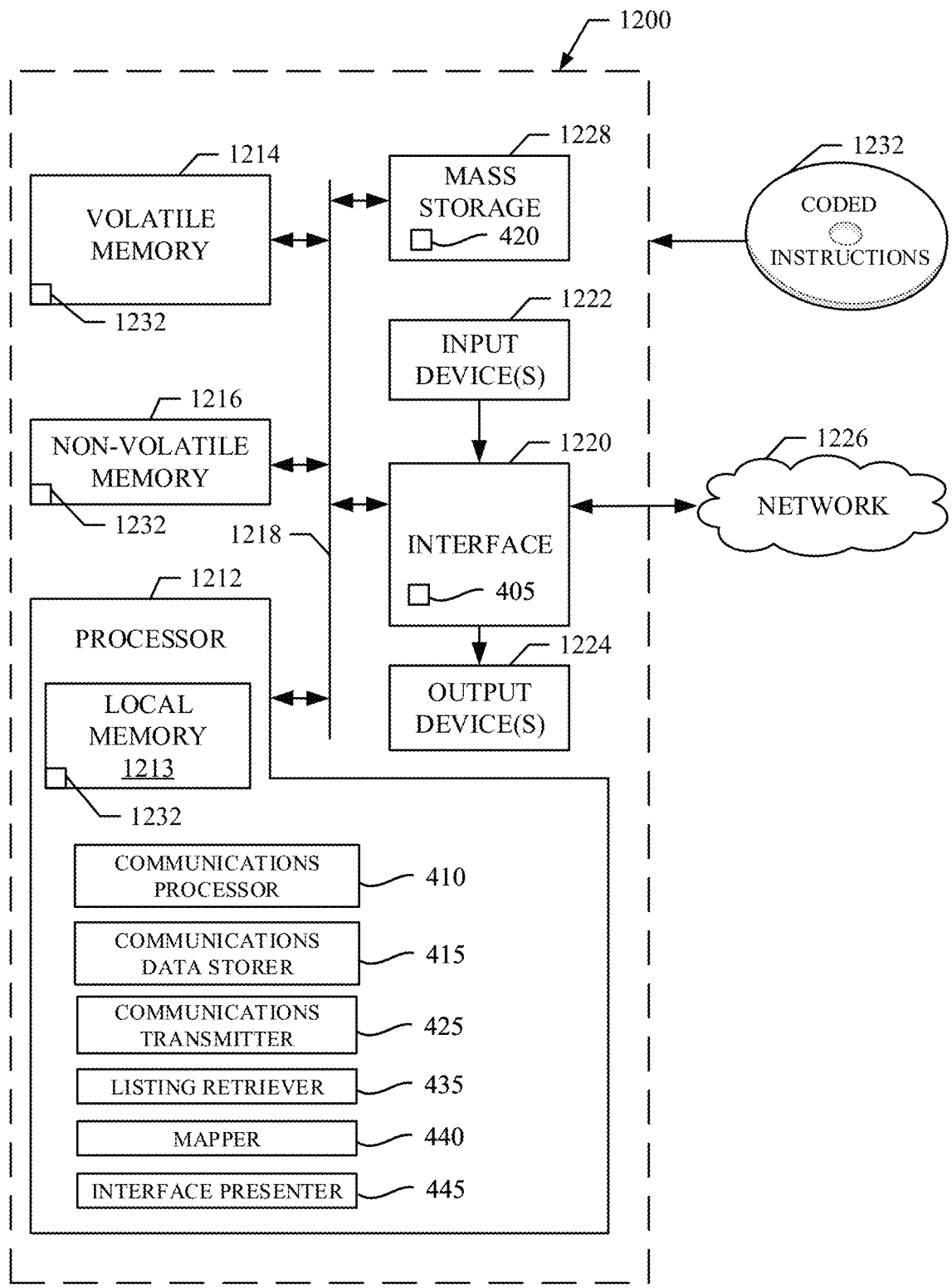
FIG. 12 is a block diagram of an example processor platform capable of executing the example machine-readable instructions of FIGS. 7, 9, and/or 10 to implement the example network communications monitor of FIGS. 1, 2, 3, and/or 4.

FIG. 12 is a block diagram of an example processor platform 1200 capable of executing the instructions of FIGS. 7, 9, and/or 10 to implement the example network communications monitor 180 of FIGS. 1, 2, 3, and/or 4. The processor platform 1200 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer.

The processor 1212 of the illustrated example includes a local memory 1213 (e.g., a cache) that stores instructions to execute the example communications analyzer 410, the example communications data storer 415, the example communications transmitter 425, the example listing retriever 435, the example mapper 440, and/or the example interface presenter 445. The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface. The example interface circuit 1220 implements the example network communicator 405.

In the illustrated example, one or more input devices 1222 are connected to the interface circuit 1220. The input device(s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives.

The coded instructions 1232 of FIGS. 7, 9, and/or 10 may be stored in the mass storage device 1228, in the volatile memory 1214, in the non-volatile memory 1216, and/or on a removable tangible computer readable storage medium such as a CD or DVD. The example mass storage 1228 implements the example network communications data store 420.

Figure 13:
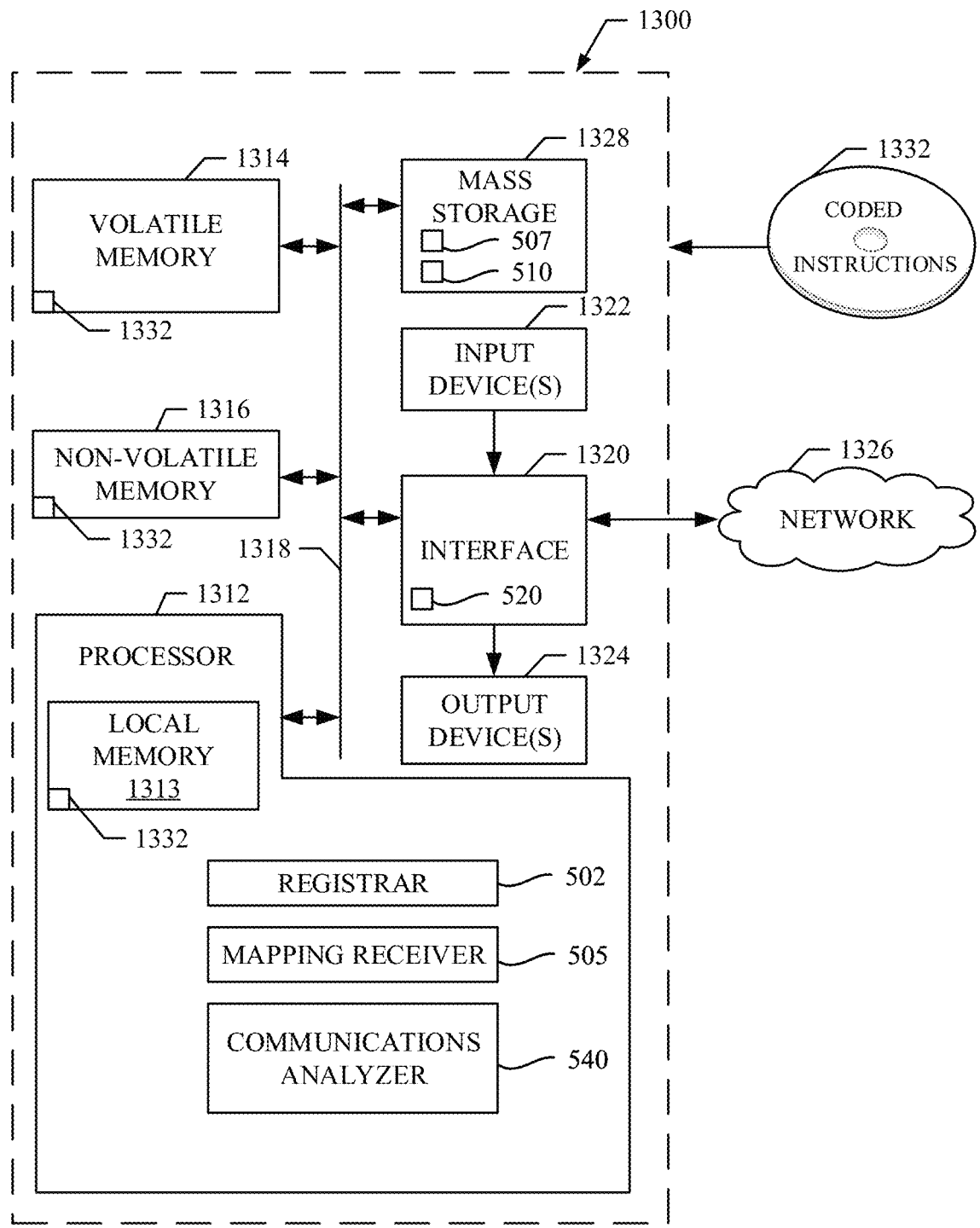
FIG. 13 is a block diagram of an example processor platform capable of executing the example machine-readable instructions of FIGS. 6 and/or 11 to implement the example network activity measurement system of FIGS. 1 and/or 5.

FIG. 13 is a block diagram of an example processor platform 1300 capable of executing the instructions of FIGS. 6 and/or 11 to implement the example network activity measurement system 110 of FIGS. 1 and/or 5. The processor platform 1300 can be, for example, a server, a personal computer, an Internet appliance, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer.

The processor 1312 of the illustrated example includes a local memory 1313 (e.g., a cache) that stores instructions to execute the example registrar 502, the example mapping receiver 505, and/or the example communications evaluator 540. The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface. The example interface circuit 1320 implements the example communications receiver 520.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives.

The coded instructions 1332 of FIGS. 6 and/or 11 may be stored in the mass storage device 1328, in the volatile memory 1314, in the non-volatile memory 1316, and/or on a removable tangible computer readable storage medium such as a CD or DVD. The example mass storage 1328 implements the example panelist device data store 507 and/or the example aggregated network communications data store 510.

From the foregoing, it will be appreciated that the above disclosed methods, apparatus and articles of manufacture facilitate creation of mappings between device names (provided by a panelist) and a hardware address (e.g., a MAC address). In examples disclosed herein, suggested mappings are determined and provided to a user. Such suggested mappings may be based on, for example, an organizationally unique identifier (OUI) portion of the MAC address as compared to a manufacturer of the device associated with the device name as identified by the panelist and/or installer (e.g., if the panelist identifies that they have an Apple device on their home network, devices having a MAC address matching an OUI associated with Apple may be suggested), an amount of recent network communications transmitted in connection with a MAC address (e.g., to identify a device, the panelist may cause the device to transmit and/or request data such that network activity can be used to identify the device), etc.

The use of suggested mappings enables panelists and/or installers to more easily create the mappings. In such a manner, panelists and/or installers are more likely to provide complete mappings for the devices on their network (e.g., devices are less likely to be omitted). Such mappings enable association of network communications transmitted to and/or from the device with a user-provided device name and, in some examples, with additional metadata about the device. For example, when registering for a panel, a user might provide a name of a device along with a make and/or model of the device. As a result, when the device name is mapped to a hardware address of a device on the user's home network, communications of the device can be identified as having been transmitted to/from a device having the identified make and/or model. If the make and/or model were not provided, additional processing might need to be performed to assume the make and/or model of the device based on a hardware address. Such assumptions might not always be accurate. For example, a manufacturer might use third party networking modules that use a hardware address having an OUI that does not identify the manufacturer, but instead identifies the third party. Moreover, assignment of the remainder of the hardware address (e.g., a non-OUI portion of a MAC address) is frequently left to the discretion of the manufacturer. Some manufacturers assign hardware addresses sequentially to devices of the same model such that a range of hardware addresses might be attributable to a particular model devices. In such examples, interpolation might be used to estimate a model of the device based on a hardware address. However, such assumptions can be computationally intensive and are not always accurate. Thus, facilitating mappings between a user-provided device name and a hardware address reduces an amount of computations to be performed to identify characteristics of a device communicating on a LAN.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus to facilitate mapping a device name to a hardware address, the apparatus comprising:
   a listing retriever to retrieve a first list of device names corresponding to devices identified as present on a local area network, the first list of device names retrieved from a network activity measurement system located outside of the local area network;
   a communications analyzer to identify a second list of hardware addresses of devices communicating via the local area network;
   a user interface presenter to cause presentation of a user interface including a first table, the first table including a row for each device name in the first list of device names corresponding to devices identified as present on the local area network, the first table including an additional row to facilitate addition of a new device name by a user, the first table including a grouping of device map columns and a grouping of realtime data columns, the first table to display the device map columns to the left of the realtime data columns, a first column of the device map columns identifying a physical location of the respective device, a second column of the device map columns identifying whether the respective device is metered, a third column of the device map columns identifying a media access control address of the respective device, the third column of the device map columns including a button for each unmapped row of the first list of device names, the button to enable display of a listing of unmapped devices in a second table on the user interface, a fourth column of the realtime data columns identifying a organizationally unique identifier, a fifth column of the realtime data columns identifying a data rate; and
   a mapper to:
      inspect network communications of a device communicating via the local area network to determine a recent domain visited by the device;
      generate a suggested mapping between the device name in the first list of device names and a hardware address in the second list of hardware addresses, the suggested mapping based on the recent domain visited by the device;
      cause the user interface presenter to present the suggested mapping and the recent domain visited by the device in the second table on the user interface, the second table separate from the first table, the second table including a sixth column indicating an amount of data transmitted by the device, the second table including a seventh column indicating the recent domain visited by the device, the second table including an eighth column indicating whether the device is communicating via either wired or wireless communications;
      receive an indication from the user, the indication to confirm that the suggested mapping between the device name in the first list of device names and the hardware address in the second list of hardware addresses is correct; and
      transmit the suggested mapping to the network activity measurement system, wherein at least one of the listing retriever, the communications analyzer, the user interface presenter, or the mapper is implemented by hardware.

2. The apparatus of claim 1, wherein the mapper is to identify an organizationally unique identifier portion of a hardware address of each device communicating via the local area network as a component of the suggested mapping, and the user interface presenter is to display, in the second table, the organizationally unique identifier portion of each device communicating via the local area network in connection with a make of the corresponding device.

3. The apparatus of claim 1, wherein the first list of device names is received at the network activity measurement system during a panelist registration process.

4. The apparatus of claim 1, wherein the hardware address in the second list of hardware addresses is a media access control address.

5. The apparatus of claim 1, wherein the communications analyzer is to identify the second list of hardware addresses of devices communicating via the local area network by consulting an address resolution protocol table.

6. The apparatus of claim 1, wherein the communications analyzer is to identify the second list of hardware addresses of devices communicating via the local area network by performing a scan of the local area network.

7. The apparatus of claim 1, wherein the communications analyzer is to monitor a network communication transmitted by a device communicating via the local area network, identify a hardware address of the device transmitting the network communication in the second list of hardware addresses, and provide the network communication and the hardware address to the network activity measurement system.

8. A method of identifying a media presentation device, the method comprising:
    retrieving, by executing an instruction with a processor of a network communications monitor installed on a local area network, a first list of device names identified as present within the local area network from a network activity measurement system located outside of the local area network;
    identifying, by executing an instruction with the processor, a second list of hardware addresses of devices communicating via the local area network;
    inspecting, by executing an instruction with the processor of the network communications monitor, network communications of a device communicating via the local area network to determine a recent domain visited based the network communications for each of the devices in the first list of device names;
    generating a suggested mapping between a device name in the first list of device names and a hardware address in the second list of hardware addresses, the suggested mapping based on the recent domain visited by the device;
    causing a user interface to be displayed, the user interface including a first tabular user interface element, the first tabular user interface element including a row for each device name in the first list of device names corresponding to devices identified as present on the local area network, the first tabular user interface element including an additional row to facilitate addition of a new device name by a user, the first tabular user interface element including a grouping of device map columns and a grouping of realtime data columns, the first tabular user interface element to display the device map columns to the left of the realtime data columns, the first tabular user interface element including a first column of the device map columns identifying a physical location of the respective device, the first tabular user interface element including a second column of the device map columns identifying whether the respective device is metered, the first tabular user interface element including a third column of the device map columns identifying a media access control address of the respective device, the third column of the device map columns including a button for each unmapped row of the first list of device names, the button to enable display of a listing of unmapped devices in a second tabular user interface element on the user interface, a fourth column of the realtime data columns identifying a organizationally unique identifier, a fifth column of the realtime data columns identifying a data rate, the second tabular user interface element separate from the first tabular user interface element, the second tabular user interface element including a sixth column indicating an amount of tata transmitted by the device, the second tabular user interface element including a seventh column indicating the suggested mapping, the second tabular user interface element including an eighth column indicating the recent domain visited by the device, the second tabular user interface element including a ninth column indicating whether the device is communicating either wired or wireless communications;
    receiving an indication from a user, the indication to confirm that the suggested mapping between the device name in the first list of device names and the hardware address in the second list of hardware addresses is correct; and
    providing the suggested mapping from the network communications monitor to the network activity measurement system.

9. The method of claim 8, wherein the first list of device names is received at the network activity measurement system during a panelist registration process.

10. The method of claim 8, further including providing, by executing an instruction with the processor, the network communications and the hardware address in the second list of hardware addresses to the network activity measurement system.

11. A non-transitory computer readable medium comprising instructions which, when executed, cause a processor of a network communications monitor installed on a local area network to at least:
    retrieve a first list of device names identified as present within the local area network from a network activity measurement system located outside of the local area network;
    identify a second list of hardware addresses of devices communicating via the local area network;
    inspect network communications of a device communicating via the local area network to determine a recent domain visited based the network communications for each of the devices;
    generating a suggested mapping between a device name in the first list of device names and a hardware address in the second list of hardware addresses, the suggested mapping based on the recent domain visited by the device;
    cause a user interface to be displayed, the user interface including a first tabular user interface element, the first tabular user interface element including a row for each device name in the first list of device names corresponding to devices identified as present on the local area network, the first tabular user interface element including an additional row to facilitate addition of a new device name by a user, the first tabular user interface element including a grouping of device map columns and a grouping of realtime data columns, the first tabular user interface element to display the device map columns to the left of the realtime data columns, the first tabular user interface element including a first column of the device map columns identifying a physical location of the respective device, the first tabular user interface element including a second column of the device map columns identifying whether the respective device is metered, and the first tabular user interface element including a third column of the device map columns identifying a media access control address of the respective device, the third column of the device map columns including a button for each unmapped row of the first list of device names, the button to enable display of a listing of unmapped devices in a second tabular user interface element on the user interface, a fourth column of the realtime data columns identifying a organizationally unique identifier, a fifth column of the realtime data columns identifying a data rate, the user interface including a second tabular user interface element separate from the first tabular user interface element, the second tabular user interface element including a sixth column indicating an amount of tata transmitted by the device, the second tabular user interface element including a seventh column indicating the suggested mapping, the second tabular user interface element including an eighth column indicating the recent domain visited by the device, the second tabular user interface element including a ninth column indicating whether the device is communicating either wired or wireless communications;

receive an indication from a user, the indication to confirm that the suggested mapping between the device name in the first list of device names and the hardware address in the second list of hardware addresses is correct; and provide the suggested mapping from the network communications monitor to the network activity measurement system.

12. The non-transitory computer readable medium of claim 11, wherein the instructions, when executed, cause the processor to at least provide the network communications and the hardware address in the second list of hardware addresses to the network activity measurement system.

13. The apparatus of claim 1, wherein the second table is displayed below the first table upon selection of the button, the button to include an arrow indicator pointing towards a location of the second table.

14. The method of claim 8, further including displaying the second tabular user interface element at a location indicated by an arrow included on the button.

15. The non-transitory computer readable medium of claim 11, wherein the instructions, when executed, cause the second tabular interface element to be displayed below the first tabular interface element upon selection of the button, the button to include an arrow indicator.

* * * * *